US012597735B2

(12) United States Patent
Kato et al.

(10) Patent No.: US 12,597,735 B2
(45) Date of Patent: Apr. 7, 2026

(54) LOCK MECHANISM AND CONNECTOR SET

(71) Applicant: ACES Electronics Co., Ltd., Taoyuan (TW)

(72) Inventors: Nobukazu Kato, Tokyo (JP); Hiroaki Hashimoto, Tokyo (JP)

(73) Assignee: ACES Electronics Co., Ltd., Taoyuan (TW)

( * ) Notice: Subject to any disclaimer, the term of this patent is extended or adjusted under 35 U.S.C. 154(b) by 279 days.

(21) Appl. No.: 18/374,331

(22) Filed: Sep. 28, 2023

(65) Prior Publication Data

US 2024/0113472 A1 Apr. 4, 2024

(30) Foreign Application Priority Data

Oct. 3, 2022 (JP) ................................ 2022-159686

(51) Int. Cl.
*H01R 13/627* (2006.01)
*H01R 13/633* (2006.01)

(52) U.S. Cl.
CPC ..... *H01R 13/6273* (2013.01); *H01R 13/6335* (2013.01)

(58) Field of Classification Search
CPC ........................ H01R 13/6273; H01R 13/6335
USPC .......................................................... 439/352
See application file for complete search history.

(56) References Cited

U.S. PATENT DOCUMENTS

| | | | | |
|---|---|---|---|---|
| 9,246,262 | B2 * | 1/2016 | Brown | H01R 13/62 |
| 10,230,196 | B2 * | 3/2019 | Phillips | H01R 13/6278 |
| 10,547,142 | B1 * | 1/2020 | Henry | H01R 12/79 |
| 2003/0148647 | A1 | 8/2003 | Hisamatsu et al. | |
| 2009/0186508 | A1 * | 7/2009 | Kikuchi | H01R 13/6275 439/304 |
| 2014/0315416 | A1 * | 10/2014 | Ohmura | H01R 13/639 439/352 |
| 2016/0336685 | A1 | 11/2016 | Phillips et al. | |
| 2023/0163522 | A1 | 5/2023 | Yi et al. | |

FOREIGN PATENT DOCUMENTS

| | | |
|---|---|---|
| CN | 107636911 B | 7/2020 |
| CN | 216850577 U | 6/2022 |
| JP | 2003-297482 | 10/2003 |

* cited by examiner

*Primary Examiner* — Gary F Paumen
(74) *Attorney, Agent, or Firm* — The Roy Gross Law Firm, LLC; Roy D. Gross

(57) ABSTRACT

Provided is a lock mechanism configured to hold a fitted state between a first connector and a second connector, where the first connector and the second connector as a counterpart are fittable together. The lock mechanism includes: a lock member that includes an engagement part and is provided in the first connector; a biasing part that is connected to the lock member and holds the lock member in a reference state; a pivotal shaft that is disposed parallel to a direction orthogonal to a fitting direction and pivotably supports the lock member; and an engagement-receiving part that is provided in the second connector and is engageable with the engagement part. The lock member is attached to the first connector so as to be pivotable around the pivotal shaft.

17 Claims, 27 Drawing Sheets

LOCK MECHANISM AND CONNECTOR SET

CROSS REFERENCE TO RELATED APPLICATION

This application is entitled to or claims the benefit of Japanese Patent Application No. 2022-159686, filed on Oct. 3, 2022, the disclosure of which including the specification, drawings and abstract is incorporated herein by reference in its entirety.

TECHNICAL FIELD

The present invention relates to a lock mechanism of a connector and a connector set.

BACKGROUND ART

In general, a connector set formed of a first connector and a second connector that are fittable into each other is provided with a lock mechanism for holding a fitted state (for example, Patent Literature 1 (hereinafter referred to as "PTL1"). PTL 1 discloses a technique in which a first connector is provided with a lock lever that is movable and engages with a second connector, and a fitted state between the connectors is released by operating a pull tab connected to the lock lever to move the lock lever by a force that pulls the pull tab. According to the connectors disclosed in PTL 1, it is possible to release the fitted state between the connectors by a simple operation of pulling the pull tab in one direction.

CITATION LIST

Patent Literature

PTL1
Japanese Patent Application Laid-Open No. 2003-297482

SUMMARY OF INVENTION

Technical Problem

The connectors disclosed in PTL 1, however, have excellent workability, but have a structure in which the lock lever moves in a pitch direction (an arrangement direction of contacts), where it is necessary to design a mounting space for a connector in view of the movable region of the lock lever. There is therefore room for improvement in terms of achieving a further size reduction in the mounting space.

An object of the present invention is to provide a lock mechanism and a connector set each capable of achieving a size reduction in a mounting space for a connector and also improving the workability at the time of insertion and removal of the connector.

Solution to Problem

A lock mechanism according to the present invention is a lock mechanism configured to hold a fitted state between a first connector and a second connector, where the first connector and the second connector as a counterpart are fittable together. The lock mechanism includes: a lock member that includes an engagement part and is provided in the first connector; a biasing part that is connected to the lock member and holds the lock member in a reference state; a pivotal shaft that is disposed parallel to a direction orthogonal to a fitting direction and pivotably supports the lock member; and an engagement-receiving part that is provided in the second connector and is engageable with the engagement part. The lock member is attached to the first connector so as to be pivotable around the pivotal shaft.

A connector set according to the present invention includes: a first connector; a second connector, where the first connector and the second connector as a counterpart are fittable together; and the lock mechanism described above.

Advantageous Effects of Invention

According to the present invention, it is possible to achieve a size reduction in a mounting space for a connector and also to improve the workability at the time of insertion and removal of the connector.

BRIEF DESCRIPTION OF DRAWINGS

The present invention will become more fully understood from the detailed description given hereinbelow and the appended drawings which are given by way of illustration only, and thus are not intended as a definition of the limits of the present invention, and wherein.

DESCRIPTION OF EMBODIMENTS

Hereinafter, embodiments of the present invention will be described in detail with reference to the accompanying drawings.

The present invention is an invention of a lock mechanism and is not only applied to so-called connectors for connecting electricity. For example, the present invention is applicable to units for hanging an object on a wall. In this case, one unit (second connector) that is installed on a side of the wall is provided with an engagement-receiving part, and another unit (first connector) that is attached or detached is provided with an engagement part. In the following embodiments, a description will be given using so-called connectors for connecting electricity as an example.

Embodiment 1

Figure 1A:
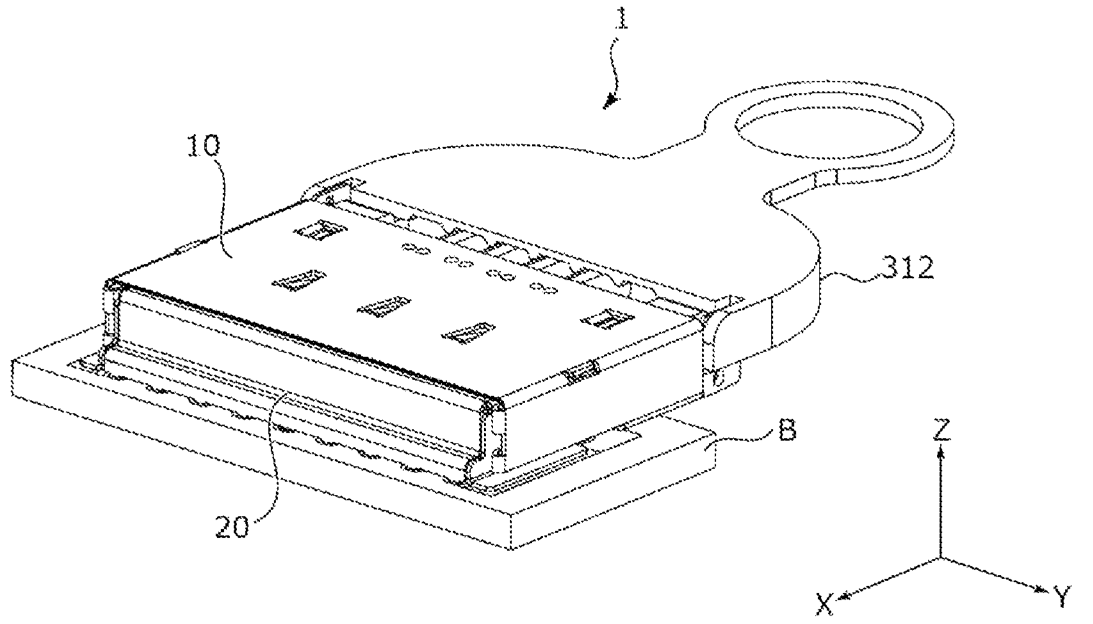
FIGS. 1A and 1B illustrate an external appearance of a connector set in a fitted state according to Embodiment 1 to which the present invention is applied.
Figure 1B:
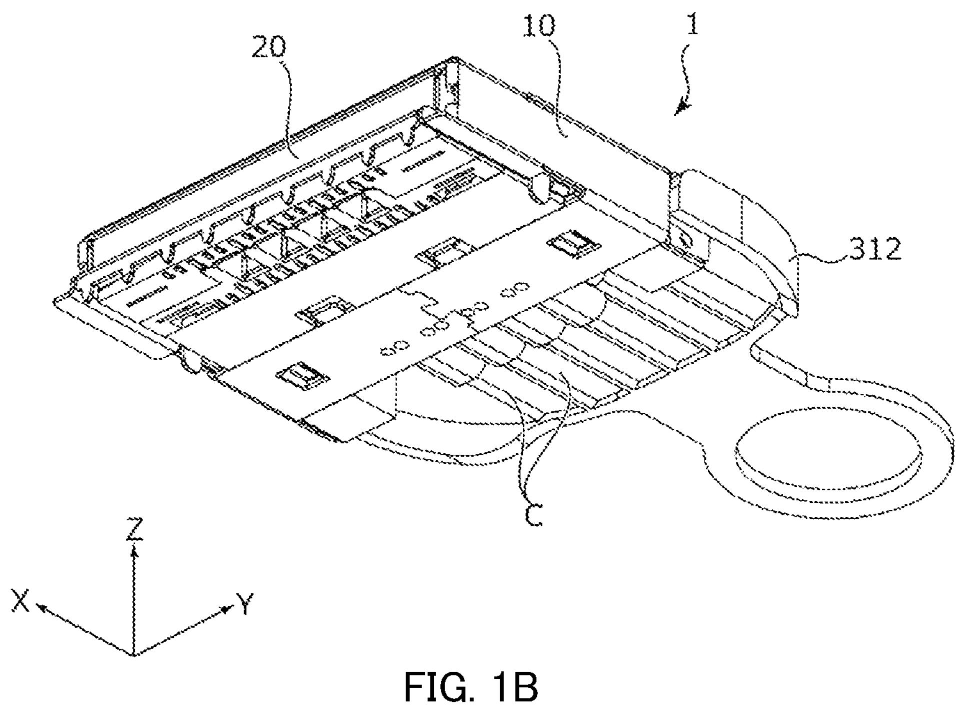
Figure 2A:
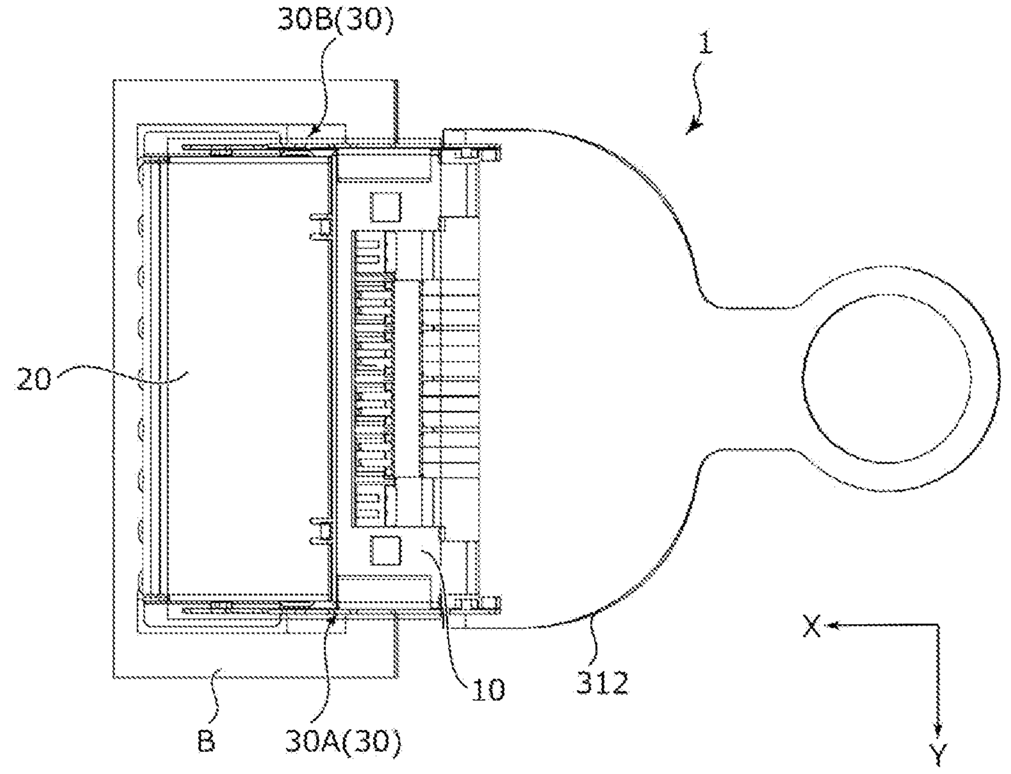
FIGS. 2A and 2B are a plan view and a side view of the connector set in the fitted state, respectively.
Figure 2B:
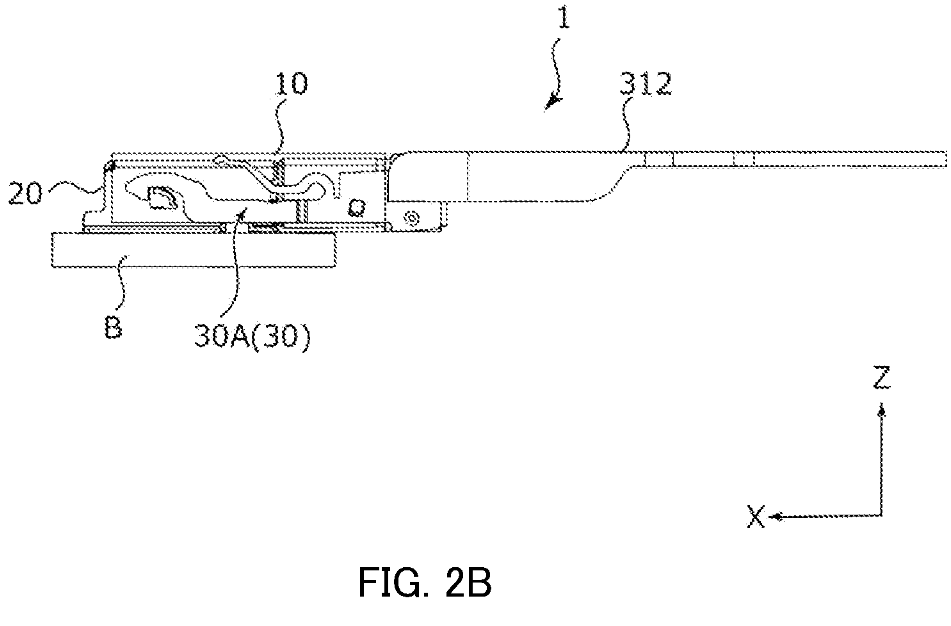

FIGS. 1A and 1B illustrate an external appearance of connector set 1 in a fitted state according to Embodiment 1 to which the present invention is applied. FIGS. 2A and 2B are a plan view and a side view of connector set 1 in the fitted state, respectively. In FIGS. 2A and 2B, connector set 1 is illustrated through cover shell 12 such that lock mechanism 30 inside connector set 1 appears in the drawings.

Figure 3:
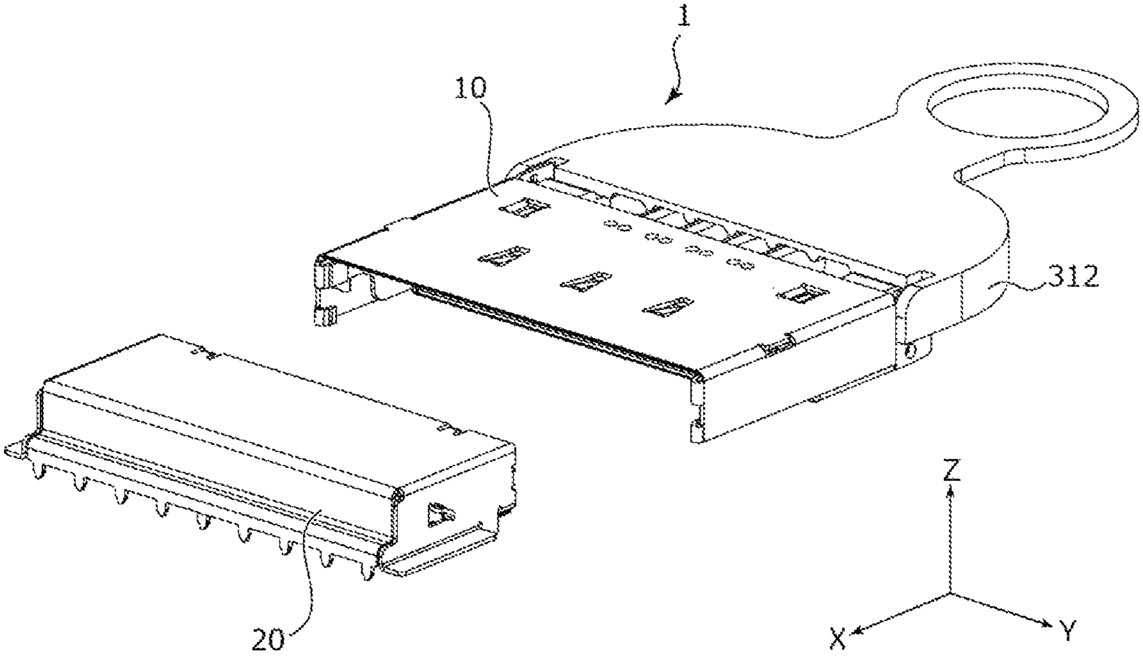
FIG. 3 illustrates an external appearance of the connector set in a non-fitted state.
Figure 4A:
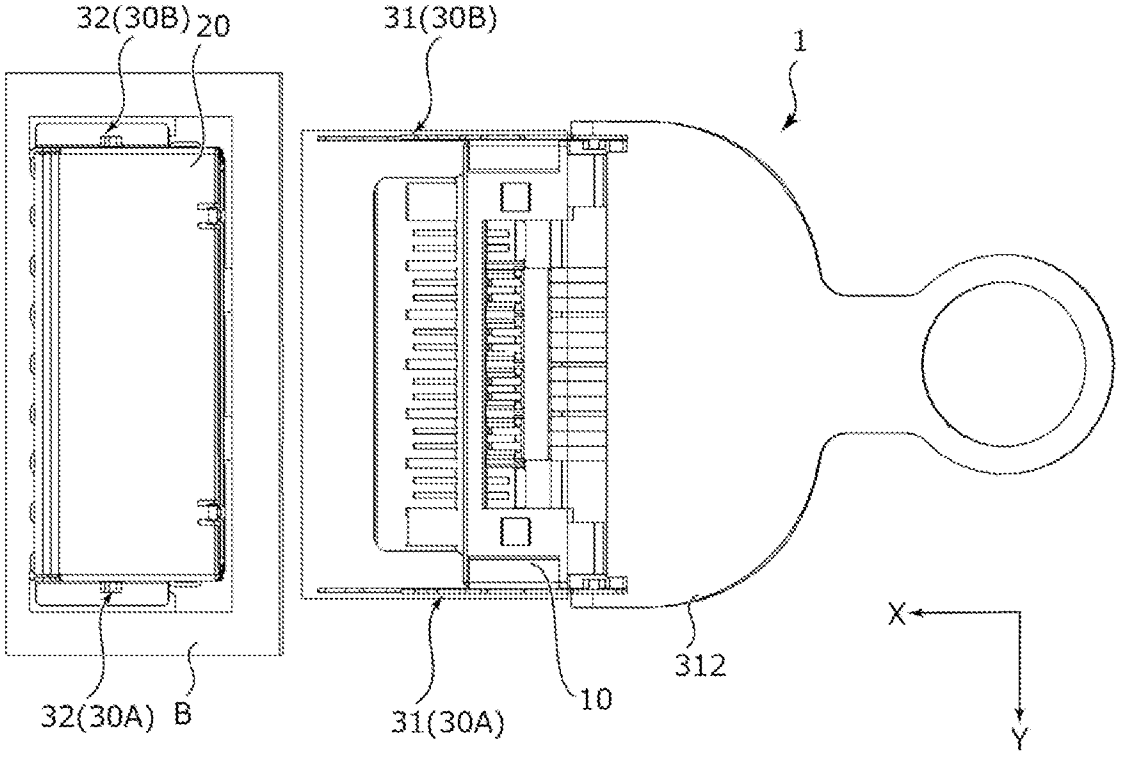
FIGS. 4A and 4B are a plan view and a side view of the connector set in the non-fitted state, respectively.
Figure 4B:
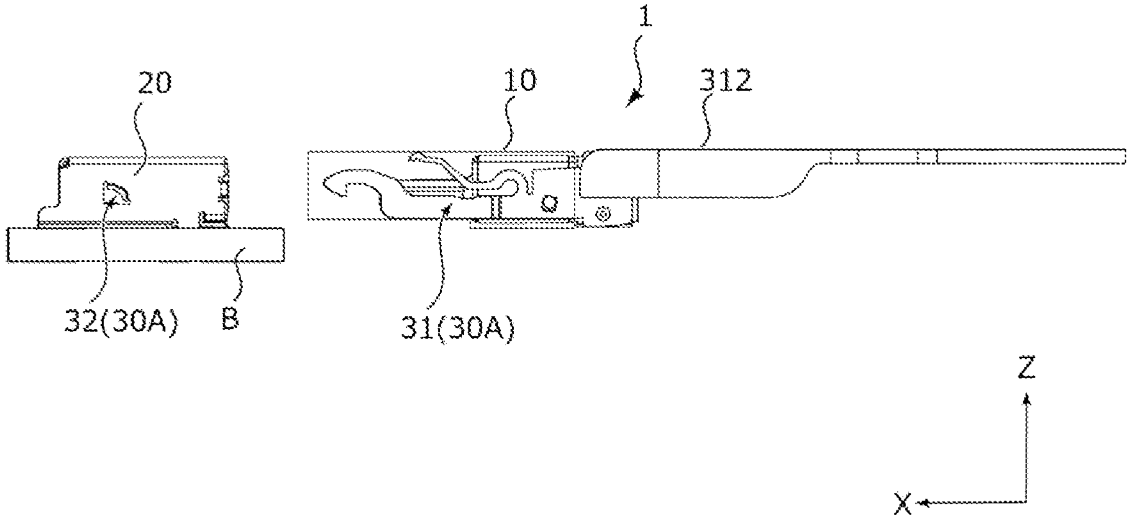

FIG. 3 illustrates an external appearance of connector set 1 in a non-fitted state. FIGS. 4A and 4B are a plan view and a side view of connector set 1 in the non-fitted state, respectively. In FIGS. 4A and 4B, connector set 1 is illustrated through cover shell 12 such that lock mechanism 30 inside connector set 1 appears in the drawings.

In the present disclosure, the structure of connector set 1 will be described using an orthogonal coordinate system (X, Y, Z). The drawings to be described later are also illustrated with the common orthogonal coordinate system (X, Y, Z). The directions along the X-axis and the Y-axis are the directions parallel to the board surface of circuit board B, and the direction along the Z-axis is the direction vertical to the board surface of circuit board B. Hereinafter, the directions along the X-axis, the Y-axis, and the Z-axis are referred to as "the X-axis direction", "the Y-axis direction", and "the Z-axis direction", respectively. In addition, a description will be given with the positive side in the Z-axis direction as the upper side and the negative side in the Z-axis direction as the lower side.

Connector set 1 is a wire-to-board connector set of a horizontal fitting type, where the Y-axis direction is a pitch direction of connector set 1 and the X-axis direction is a fitting direction of connector set 1. The pitch direction is orthogonal to the fitting direction. The fitting direction includes an insertion direction toward the positive side in the X-axis direction and a removal direction toward the negative side in the X-axis direction. Connector set 1 is used, for example, when circuit boards are interconnected using cable C in an information device such as a server, a switch (network device), and a storage.

As illustrated in FIGS. 1A and 1B, or the like, connector set 1 includes cable-side connector 10, board-side connector 20, and lock mechanism 30. Cable-side connector 10 is a connector to which cable C is connected, and board-side connector 20 is a connector that is mounted in circuit board B.

Cable C is, for example, a coaxial cable including an inner conductor (not illustrated) and an external shield layer (not illustrated) disposed outside the inner conductor via an insulator. The inner conductor of cable C is used, for example, for transmission of a high-speed (high-frequency) signal.

Cable C may be, for example, a Twinax cable in which two inner conductors are collectively covered with an insulator, an external shield layer, and a sheath. Further, for example, a flat cable such as a flexible flat cable (FFC) is also applicable to cable C.

Connector set 1 electrically connects cable C and circuit board B by horizontal fitting between cable-side connector 10 and board-side connector 20. Specifically, the inner conductor of cable C is electrically connected to the signal pattern of circuit board B via cable-side signal contact 111 of cable-side connector 10 and board-side signal contact 211 of board-side connector 20. Further, the external shield layer of cable C is connected to the ground pattern of circuit board B via cable-side ground contact 112 of cable-side connector 10 and board-side ground contact 212 of board-side connector 20.

Figure 5:
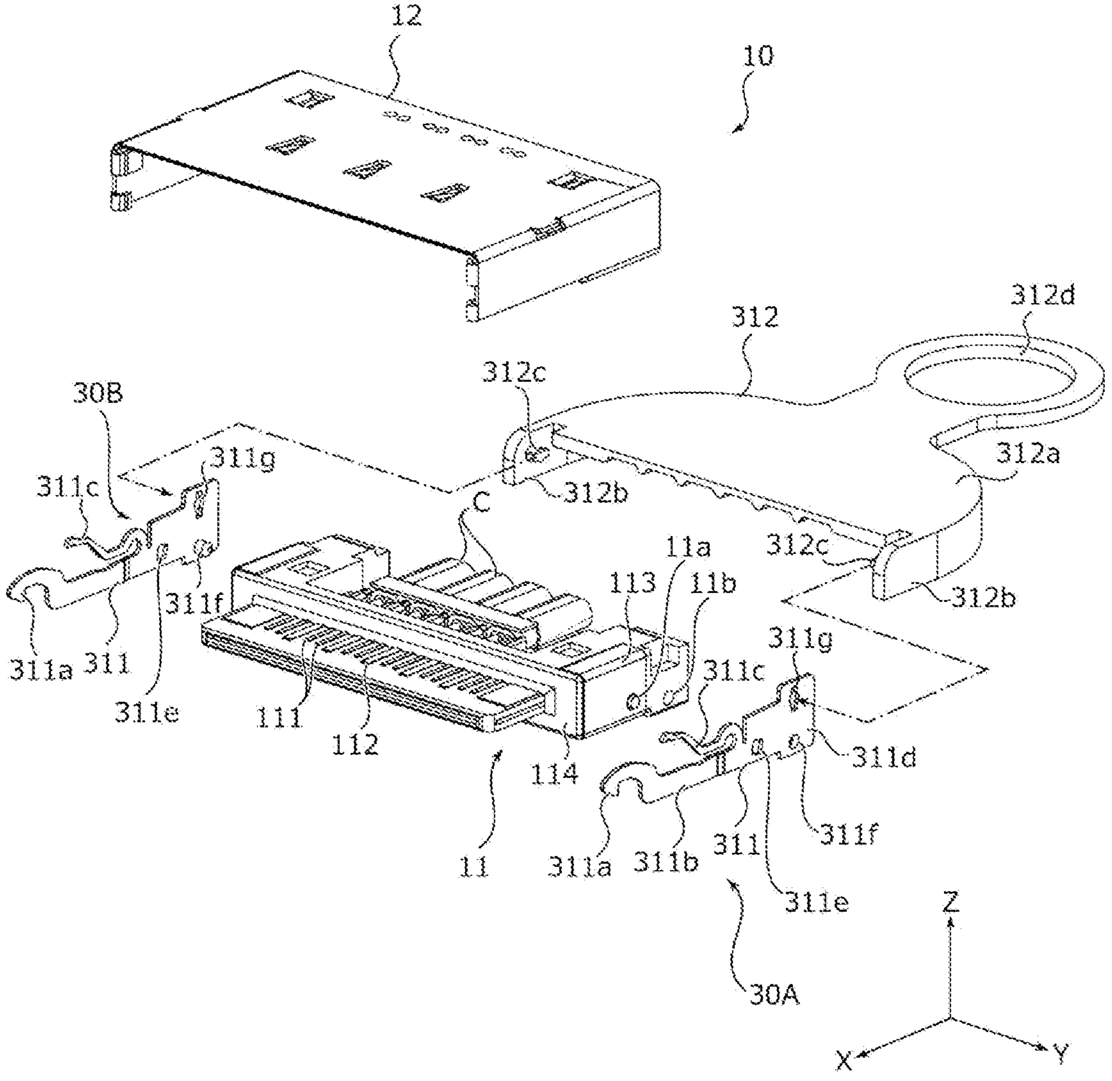
FIG. 5 is an exploded perspective view of a cable-side connector.

FIG. 5 is an exploded perspective view of cable-side connector 10.

As illustrated in FIG. 5, cable-side connector 10 includes cable-side connector body 11 and cover shell 12. Cables C are attached, in a state of being stacked in two stages, to cable-side connector body 11, for example.

Cable-side connector body 11 includes cable-side signal contact 111, cable-side ground contact 112, cable-side ground metal fitting 113, cable-side insulator 114, and the like.

Cover shell 12, cable-side signal contact 111, cable-side ground contact 112, and cable-side ground metal fitting 113 are formed of a conductive material such as metal (for example, copper alloy). Cable-side insulator 114 is formed of an insulating material such as a synthetic resin (for example, a liquid crystal polymer).

Cover shell 12 is disposed so as to cover the outside of cable-side connector body 11, and comes into contact with and is electrically connected to cable-side ground metal fitting 113. Cover shell 12 is at ground potential and functions as a shield. Note that, as with cable-side insulator 114, cover shell 12 may be formed of an insulating material such as a synthetic resin and may form a housing of cable-side connector 10.

Cable-side signal contact 111 is a member that is connected to the inner conductor of cable C. Cable-side ground contact 112 is a ground member that is connected to the ground which is a reference potential. Cable-side signal contact 111 and cable-side ground contact 112 are formed by, for example, sheet metal working (including punching and bending) of one metal sheet.

Each of cable-side signal contact 111 and cable-side ground contact 112 has a linear shape extending in the X-axis direction (fitting direction), and is disposed such that the main surface (sheet surface) thereof is along the XY plane.

Cable-side signal contacts 111 and cable-side ground contacts 112 are arranged side by side in the Y-axis direction which is the pitch direction. Cable-side ground contact 112 is disposed between cable-side signal contacts 111 adjacent to each other and functions as a shielding between signal lines.

Cable-side signal contact 111 has the same configuration and each cable-side signal contact 111 includes a signal line contact part and a signal line connection part (reference signs thereof are omitted). The signal line contact part and the signal line connection part are connected by a signal line relay part. The signal line contact part is a portion that comes into contact with and is electrically connected to board-side signal contact 211 of board-side connector 20 when cable-side connector 10 and board-side connector 20 are fitted together. The signal line connection part is a portion to which the inner conductor of cable C exposed by stepwise peeling processing on a leading-edge part of cable C is connected by a mechanical joining method such as soldering, welding, crimping, and any other like method.

Cable-side ground contact 112 has the same configuration and each cable-side ground contact 112 includes a ground contact part and a ground connection part (reference signs thereof are omitted). The ground contact part and the ground connection part are connected by a ground relay part. The ground contact part is a portion that comes into contact with and is electrically connected to board-side ground contact 212 of board-side connector 20 when cable-side connector 10 and board-side connector 20 are fitted together. The ground connection part is a portion to which the external shield layer of cable C exposed by stepwise peeling processing on the leading-edge part of cable C is connected by a mechanical joining method such as soldering, welding, crimping, and any other like method.

Cable-side ground metal fitting 113 is a ground member that is connected, together with cable-side ground contact 112, to the ground which is the reference potential. Cable-side ground metal fitting 113 is formed by, for example, sheet metal working (including punching and bending) of one metal sheet.

Cable-side insulator 114 forms a housing of cable-side connector 10. Cable-side signal contact 111, cable-side ground contact 112, and cable-side ground metal fitting 113 are assembled to cable-side insulator 114.

Cable-side signal contact 111, cable-side ground contact 112, and cable-side ground metal fitting 113 are formed integrally with cable-side insulator 114 by, for example, insert-molding. Cable-side signal contact 111, cable-side ground contact 112, and cable-side ground metal fitting 113 are disposed in a state of being separated from each other and are electrically insulated from each other by cable-side insulator 114.

Figure 6:
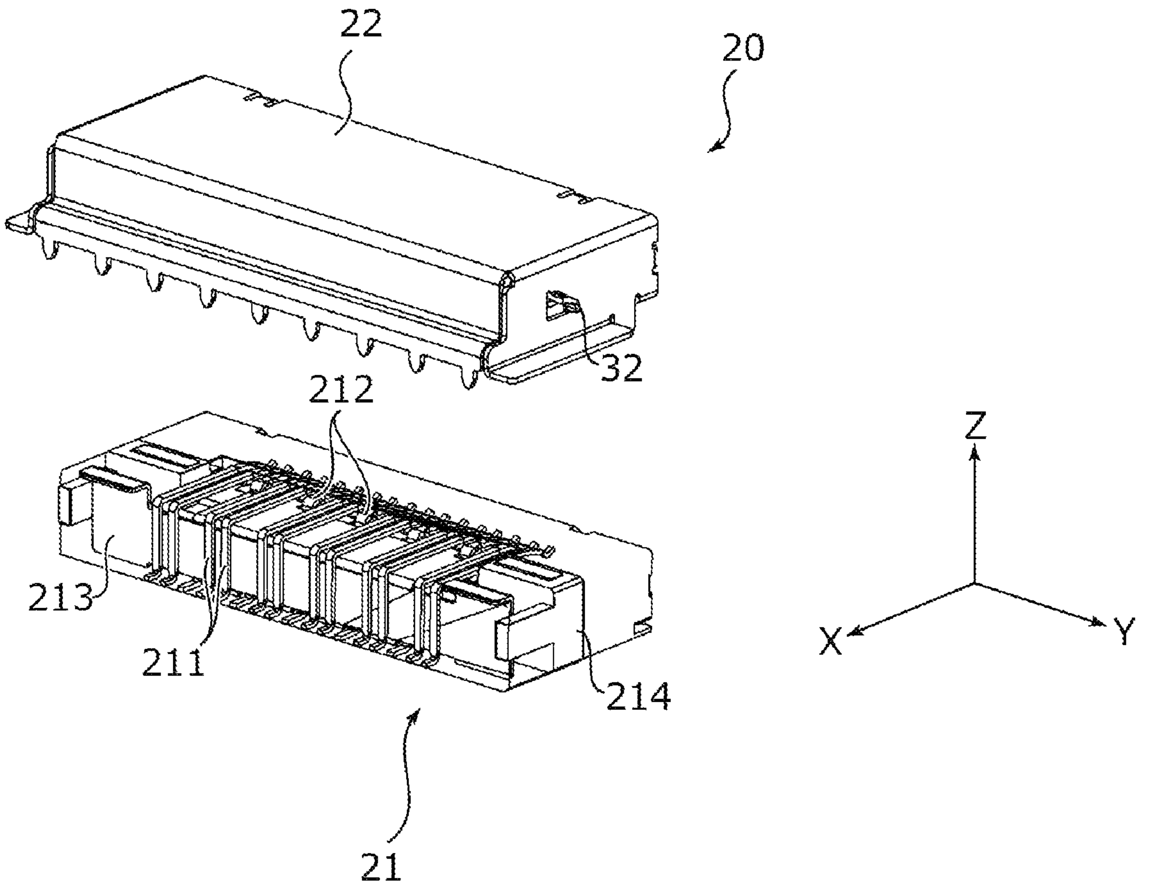
FIG. 6 is an exploded perspective view of a board-side connector.

FIG. 6 is an exploded perspective view of board-side connector 20.

As illustrated in FIG. 6, board-side connector 20 includes board-side connector body 21 and board-side shell 22. Board-side connector body 21 includes board-side signal contact 211, board-side ground metal fitting 213, board-side insulator 214, and the like.

Board-side shell 22, board-side signal contact 211, and board-side ground metal fitting 213 are formed of a conductive material such as metal (for example, copper alloy). Board-side insulator 214 is formed of an insulating material such as a synthetic resin (for example, a liquid crystal polymer).

Board-side shell 22 is a frame that is connected to the ground pattern of circuit board B and has a rectangular shape corresponding to the outer edge of board-side insulator 214 in plan view as viewed in the Z-axis direction. Board-side shell 22 is formed by, for example, sheet metal working (including punching and bending) of one metal sheet. Board-side shell 22 is disposed so as to cover the outside of board-side connector body 21, and comes into contact with and is electrically connected to board-side ground metal fitting 213 of board-side connector body 21. Board-side shell 22 is at ground potential and functions as a shield. Board-side shell 22 is fitted into, for example, a peripheral portion of board-side insulator 214.

Board-side signal contact 211 is a member that is connected to cable-side signal contact 111 of cable-side connector 10. Board-side ground metal fitting 213 includes a plurality of board-side ground contacts 212 that is connected to cable-side ground contacts 112 of cable-side connector 10. Board-side signal contact 211 and board-side ground metal fitting 213 are formed by, for example, sheet metal working (including punching and bending) of one metal sheet.

Each of the contact portion between board-side signal contact 211 and cable-side signal contact 111 and the contact portion between board-side ground contact 212 and cable-side ground contact 112 has a linear shape extending in the X-axis direction (fitting direction), and is disposed such that the main surface (sheet surface) thereof is along the XY plane.

Board-side signal contacts 211 and board-side ground contacts 212 are arranged side by side in the Y-axis direction which is the pitch direction. Board-side ground contact 212 is disposed between board-side signal contacts 211 adjacent to each other and functions as a shielding between signal lines.

Board-side insulator 214 has a rectangular shape in plan view as viewed in the Z-axis direction and forms a housing of board-side connector 20. Board-side signal contact 211 and board-side ground metal fitting 213 are assembled to board-side insulator 214.

Board-side signal contact 211 and board-side ground metal fitting 213 are formed integrally with board-side insulator 214 by, for example, insert-molding. Board-side signal contact 211 and board-side ground metal fitting 213 are disposed in a state of being separated from each other and are electrically insulated from each other by board-side insulator 214.

Further, connector set 1 is provided with lock mechanism 30 for holding a fitted state between cable-side connector 10 and board-side connector 20. Lock mechanism 30 is formed of first lock mechanism 31 provided in cable-side connector 10 and second lock mechanism 32 provided in board-side connector 20.

Lock mechanism 30 is configured such that first lock mechanism 31 and second lock mechanism 32 mechanically engage with each other in conjunction with a work of inserting cable-side connector 10 into board-side connector 20 to cause cable-side connector and board-side connector 20 to be fitted together. Further, lock mechanism 30 is configured such that engagement between first lock mechanism 31 and second lock mechanism 32 is released in conjunction with a work of removing cable-side connector 10 from board-side connector 20 to release a fitted state therebetween.

In the present embodiment, lock mechanisms 30A and 30B are provided in the two side surfaces of connector set 1 along the XZ plane. Lock mechanisms 30A and 30B have the same configuration and are disposed so as to be plane-symmetrical with respect to the XZ plane.

Figure 7A:
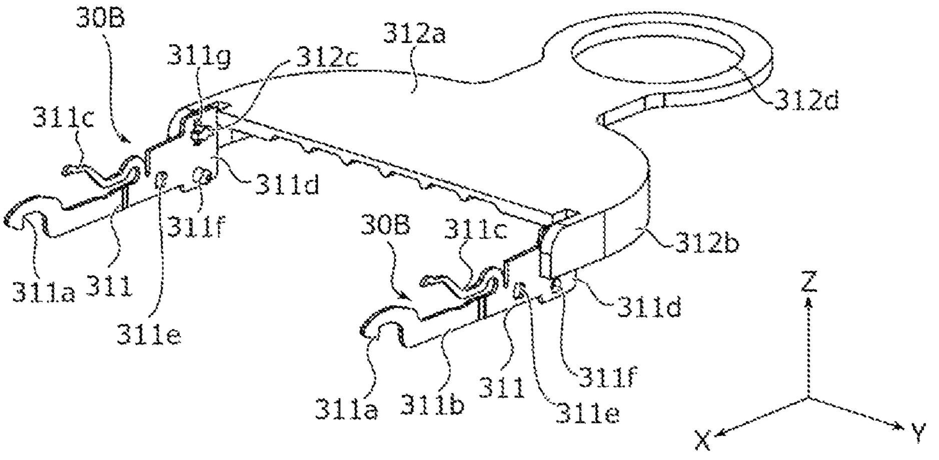
FIGS. 7A to 7C are a perspective view, a plan view, and a side view of a first lock mechanism, respectively.
Figure 7B:
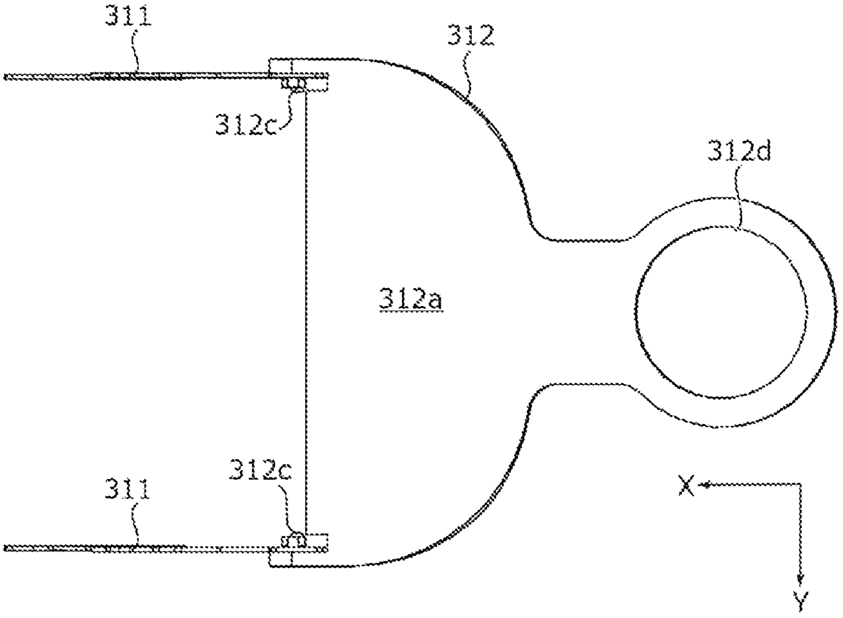
Figure 7C:
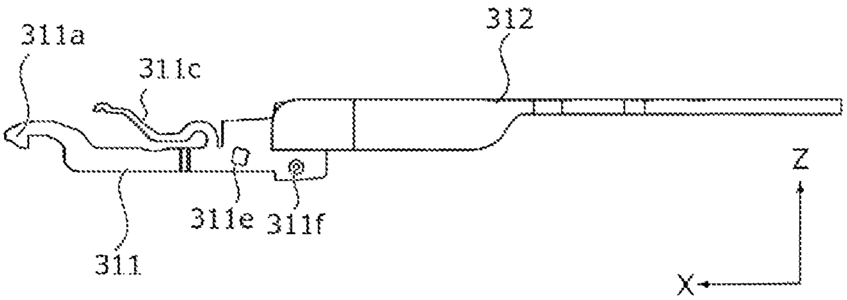

First lock mechanism 31 provided in cable-side connector 10 includes lock member 311 and removal operation member 312 as illustrated in FIGS. 7A to 7C. FIGS. 7A to 7C are a perspective view, a plan view, and a side view of first lock mechanism 31, respectively.

Removal operation member 312 is an operation member that is operated by a worker when removing cable-side connector 10 from board-side connector 20.

Removal operation member 312 is preferably a rigid body that is non-deformable with respect to a pulling operation in the removal direction. Removal operation member 312 is formed by, for example, sheet metal working (including punching and bending) of one metal sheet. Thus, it is possible to efficiently transmit a force, which pulls removal operation member 312, to lock member 311 and to easily release engagement between first lock mechanism 31 and second lock mechanism 32.

Removal operation member 312 includes, for example, flat part 312*a*, which extends along the XY plane, and side surface part 312*b*, which is formed to vertically suspend from flat part 312*a*. Plate-attaching pieces 312*c* are provided in the inner surfaces of two side surface parts 312*b*. Further, removal operation member 312 is provided with operation hole 312*d* for hooking a finger therein during the work.

Lock member 311 is a member having a sheet shape formed by, for example, sheet metal working (punching) of one metal sheet. Lock member 311 is disposed in each of the two side surfaces of cable-side connector body 11 along the XZ plane such that a sheet thickness direction of lock member 311 coincides with the pitch direction (the Y-axis direction). Each of two lock members 311 in lock mechanisms 30A and 30B is connected to removal operation member 312 and is held between cable-side connector body 11 and removal operation member 312. That is, two lock members 311 are coupled by removal operation member 312 and are configured such that two lock members 311 move together in conjunction with an operation of pulling removal operation member 312 in the removal direction (the negative side in the X-axis direction).

Lock member 311 includes engagement part 311*a*, lock plate part 311*b*, biasing part 311*c*, and fixing part 311*d*.

Engagement part 311*a* is a portion that engages with second lock mechanism 32 provided in board-side connector 20. Engagement part 311*a* is disposed, for example, at the leading-end of lock plate part 311*b* on the positive side in the X-axis direction. Engagement part 311*a* has a hook shape and engages with second lock mechanism 32 to regulate the movement of lock member 311 to the negative side in the X-axis direction.

Fixing part 311*d* is a portion that is attached to cable-side connector body 11. In fixing part 311*d*, opening 311*e*, boss 311*f*, and removal member-attaching hole 311*g* are formed.

Lock plate part 311*b* extends from fixing part 311*d* to the positive side in the X-axis direction, and engagement part 311*a* is disposed at the leading-edge of lock plate part 311*b*.

Biasing part 311*c* has a function of holding lock member 311 in a reference state. Biasing part 311*c* is a portion that generates, when lock member 311 pivots from the reference state and is displaced, a restoring force for returning lock member 311 to the reference state. Biasing part 311*c* includes a free end part on a side of the leading-end of biasing part 311*c*, which abuts on cover shell 12 of cable-side connector 10, a fixed end part, which is connected to lock plate part 311*b*, and an arm part, which couples the free end part and the fixed end part (reference signs thereof are omitted). The fixed end part of biasing part 311*c* is, for example, continuously provided to the connection portion of fixing part 311*d* and lock plate part 311*b*, and the arm part of biasing part 311*c* is formed to be bent such that a predetermined restoring force is generated by elastic deformation. The "reference state" refers to a state in which no external force (for example, a tensile force when removal operation member 312 is pulled in the removal direction) acts on lock member 311.

Opening 311*e* is a portion into which projection part 11*a* of cable-side connector body 11 is fitted. Opening 311*e* is formed to be one size larger than projection part 11*a*. Projection part 11*a* is loosely fitted into opening 311*e*, and opening 311*e* regulates, while allowing lock member 311 to pivot, the range of pivoting thereof. Projection part 11*a* is formed in, for example, cable-side insulator 114.

Boss 311*f* is a portion that is fitted into boss-receiving recessed part 11*b* of cable-side connector body 11. Boss 311*f* is formed along the Y-axis direction toward a side of cable-side connector body 11. Boss 311*f* is pivotably fitted into boss-receiving recessed part 11*b* and functions as a pivotal shaft when lock member 311 pivots. Boss-receiving recessed part 11*b* is formed in, for example, cable-side insulator 114. That is, cable-side connector body 11 (for example, cable-side insulator 114) including boss-receiving recessed part 11*b* partially forms first lock mechanism 31.

Removal member-attaching hole 311*g* is a portion to which plate-attaching piece 312*c* of removal operation member 312 is attached. When removal operation member 312 is pulled to the negative side in the X-axis direction, a tensile force acts on the portion of removal member-attaching hole 311*g*. When lock member 311 is in the reference state, removal member-attaching hole 311*g* is located on the positive side of boss 311*f* in the Z-axis direction. That is, in the reference state of lock member 311, the position of removal member-attaching hole 311*g* in the Z-axis direction is different from the position of boss 311*f* in the Z-axis direction.

In cable-side connector 10, lock member 311 is disposed in each of the two side surfaces of cable-side connector body 11 along the XZ plane. Specifically, projection part 11*a* of cable-side connector body 11 is fitted into opening 311*e* of lock member 311 and boss 311*f* of lock member 311 is fitted into boss-receiving recessed part 11*b* of cable-side connector body 11. In this state, plate-attaching piece 312*c* of removal operation member 312 is connected to removal member-attaching hole 311*g* of lock member 311. Further, cover shell 12 is attached to cable-side connector body 11. In this way, lock member 311 is held in a predetermined attitude so as not to fall off from cable-side connector 10.

At this time, the free end part of biasing part 311*c* abuts on cover shell 12, and thus, pivoting of lock member 311 such that engagement part 311*a* is displaced to the positive side in the Z-axis direction is regulated. Further, the end edge of opening 311*e* on the positive side in the Z-axis direction abuts on projection part 11*a*, and thus, pivoting of lock member 311 such that engagement part 311*a* is displaced to the negative side in the Z-axis direction is regulated. This state is the "reference state" of lock member 311 (see FIG. 8A).

Hereinafter, a moment for pivoting lock member 311 in a direction in which engagement part 311*a* is displaced to the positive side in the Z-axis direction (clockwise in FIG. 8A or the like) is referred to as "first moment", and a moment for pivoting lock member 311 in a direction in which engagement part 311*a* is displaced to the negative side in the Z-axis direction (counterclockwise in FIG. 8A or the like) is referred to as "second moment". The same applies to other embodiments.

Further, in the reference state, biasing part 311*c* is preferably biased in the counterclockwise direction (so-called preload), that is, the second moment is preferably caused to be generated in lock member 311. Since the attitude of lock member 311 is stabilized by the biasing force of biasing part 311*c*, it is possible to surely hold a locked state in the fitted state (see FIG. 9A) and it is possible to prevent lock member 311 from rattling in the non-fitted state (see FIG. 8A).

Second lock mechanism 32 provided in board-side connector 20 is an engagement-receiving part (hereinafter referred to as "engagement-receiving part 32") that engages with engagement part 311*a* of lock member 311 and regulates the movement of lock member 311 in the X-axis direction.

Engagement-receiving part 32 is provided in, for example, on each of the side surfaces of board-side shell 22 of board-side connector 20 along the XZ plane. The position of engagement-receiving part 32 in the Z-axis direction is comparable to the position of engagement part 311*a* of lock member 311 in the reference state.

Figure 8A:
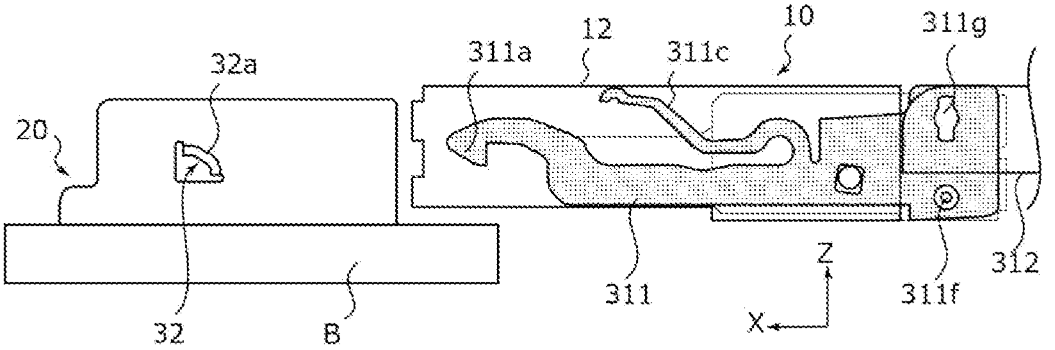
FIGS. 8A to 8D illustrate a state transition of a lock mechanism at the time of a work of inserting the cable-side connector into the board-side connector.
Figure 8B:
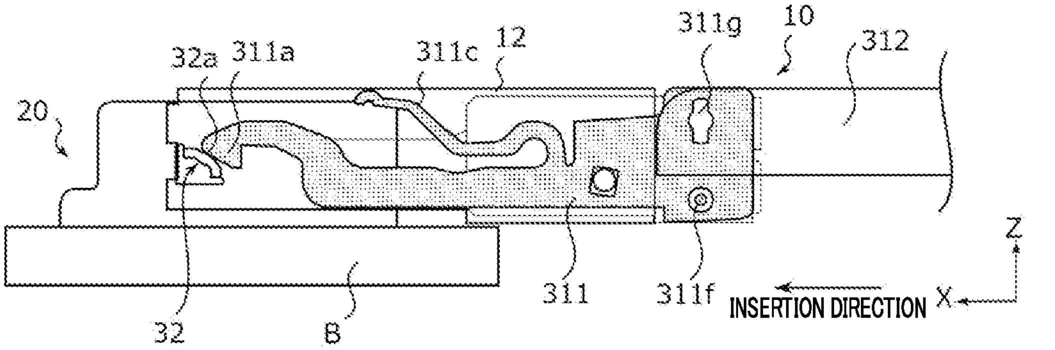
Figure 8C:
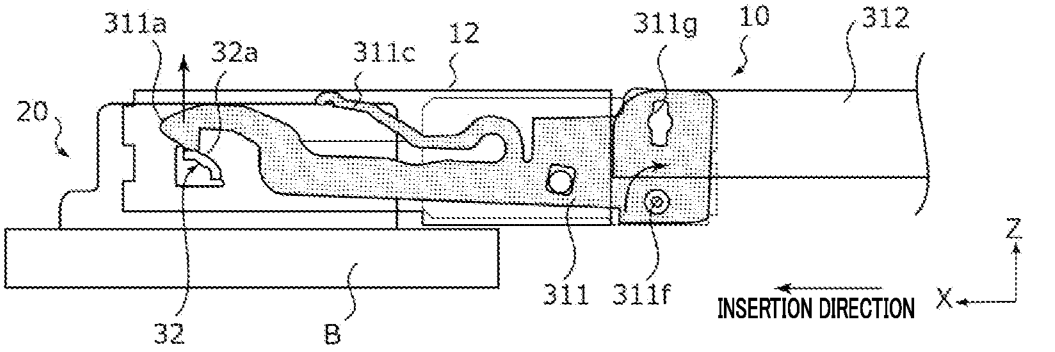
Figure 8D:
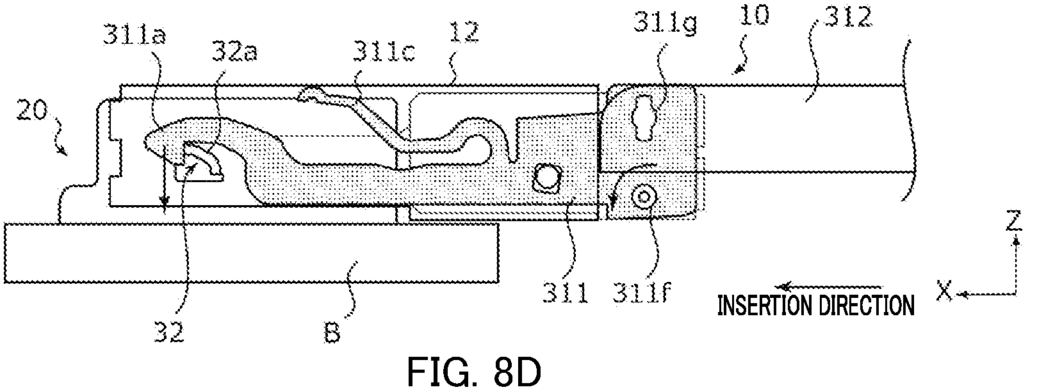

Engagement-receiving part 32 includes abutting surface 32*a* that abuts on engagement part 311*a* of lock member 311 in association with movement of lock member 311 to the positive side in the X-axis direction (see FIG. 8A). Abutting surface 32*a* is formed to be inclined such that engagement part 311*a* of lock member 311 is displaced to the positive side in the Z-axis direction and is raised on abutting surface 32*a* in association with movement of lock member 311 in the insertion direction (to the positive side in the X-axis direction).

FIGS. 8A to 8D illustrate a state transition of lock mechanism 30 at the time of a work of inserting cable-side connector 10 into board-side connector 20.

In a case where cable-side connector 10 is fitted into board-side connector 20, a worker first adjusts the positions thereof in the Z-axis direction such that the fitting portions of cable-side connector 10 and board-side connector 20 match (see FIG. 8A). At this time, lock member 311 is in the reference state and is in a state of being difficult to pivot. That is, in the reference state in which no external force is applied to lock member 311, lock member 311 is in a stable state in which lock member 311 hardly pivots both clockwise and counterclockwise.

Next, cable-side connector 10 is moved to the positive side in the X-axis direction with respect to board-side connector 20. Lock member 311 is maintained in the reference state until engagement part 311*a* reaches engagement-receiving part 32 (see FIG. 8B).

Further, when a force to the positive side in the X-axis direction is applied to cable-side connector 10, engagement part 311*a* is raised on abutting surface 32*a* of engagement-receiving part 32 to the positive side in the Z-axis direction, and the first moment is generated in lock member 311. Lock member 311 pivots around boss 311*f* clockwise as viewed from the positive side in the Y-axis direction (see FIG. 8C). At this time, a portion of biasing part 311*c*, which abuts on cover shell 12, cannot move (pivot), and thus, a restoring force is generated by elastic deformation. In lock member 311, the second moment is generated by the restoring force of biasing part 311*c*.

Further, when a force to the positive side in the X-axis direction is applied to cable-side connector 10, engagement part 311*a* passes over abutting surface 32*a* of engagement-receiving part 32. Due to the restoring force generated in biasing part 311*c*, lock member 311 pivots around boss 311*f* counterclockwise as viewed from the positive side in the Y-axis direction and returns to the reference state (see FIG. 8D).

Engagement-receiving part 32 provided in board-side connector 20 and engagement part 311*a* of lock member 311 provided in cable-side connector 10 mechanically engage with each other, and connector set 1 is held in a non-removable state to an external force of a predetermined value or lower.

FIGS. 9A to 9D illustrate a state transition of lock mechanism 30 at the time of a work of removing cable-side connector 10 from board-side connector 20.

Figure 9A:
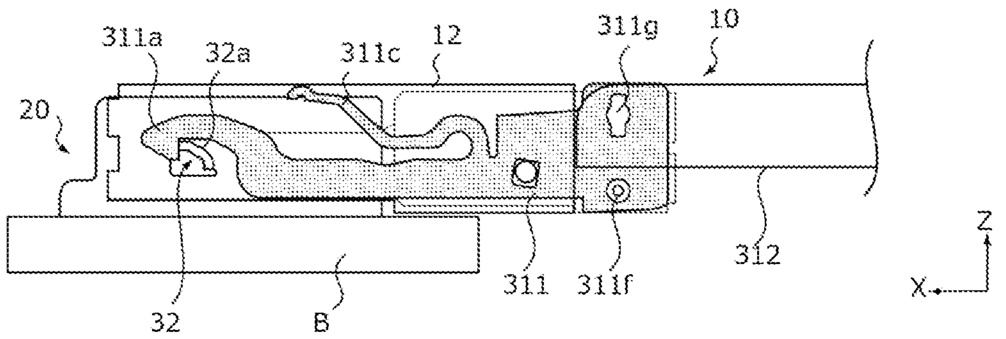
FIGS. 9A to 9D illustrate a state transition of the lock mechanism at the time of a work of removing the cable-side connector from the board-side connector.

In a state in which board-side connector 20 and cable-side connector 10 are fitted together, engagement-receiving part 32 provided in board-side connector 20 and engagement part 311*a* of lock member 311 provided in cable-side connector 10 mechanically engage with each other, and connector set 1 is held in a non-removable state to an external force of a predetermined value or lower (see FIG. 9A).

In a case where cable-side connector 10 is removed from board-side connector 20, a worker pulls removal operation member 312 to the negative side in the X-axis direction. In lock member 311, the positions of boss 311*f* and removal member-attaching hole 311*g* in the Z-axis direction are different, and a direction connecting boss 311*f* and removal member-attaching hole 311*g* intersects the direction of the tensile force. Accordingly, in lock member 311, the first moment is generated with boss 311*f* as a fulcrum (pivotal shaft) and removal member-attaching hole 311*g* as a point where a force is applied. As the first moment is generated in lock member 311, engagement part 311*a* is going to be displaced to the positive side in the Z-axis direction.

Figure 9B:
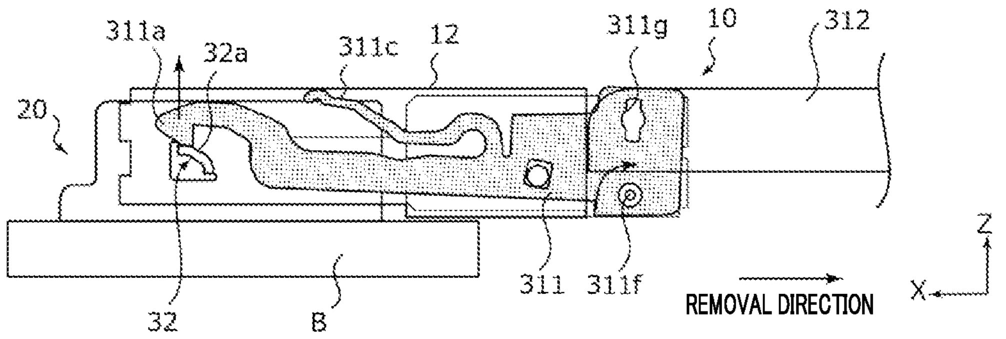

When this first moment exceeds the force due to the engagement between engagement part 311*a* and engagement-receiving part 32, lock member 311 pivots around boss 311*f* clockwise as viewed from the positive side in the Y-axis direction, and engagement part 311*a* rises up on engagement-receiving part 32 (see FIG. 9B). More specifically, in lock member 311 in the fitted state (locked state), the second moment is generated by a preload of biasing part 311*c*. When the first moment generated in lock member 311 at the time of pulling removal operation member 312 exceeds the second moment due to the preload, lock member 311 pivots clockwise. At this time, the portion of biasing part 311*c*, which abuts on cover shell 12, cannot move (pivot), and thus, a restoring force is generated by elastic deformation. In lock member 311, the second moment is generated by the restoring force of biasing part 311*c*.

Figure 9C:
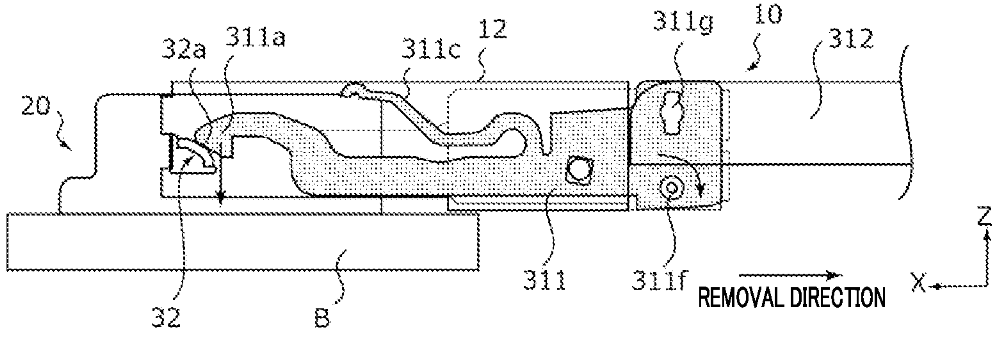
Figure 9D:
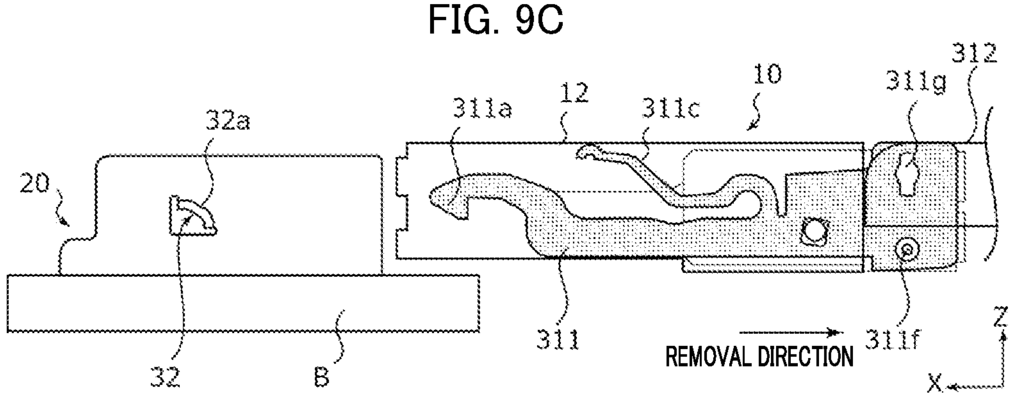

When removal operation member 312 is further pulled to the negative side in the X-axis direction, the restoring force generated in biasing part 311*c* causes engagement part 311*a* to slide down on abutting surface 32*a* of engagement-receiving part 32 (see FIG. 9C). Lock member 311 pivots around boss 311*f* counterclockwise as viewed from the positive side in the Y-axis direction and returns to the reference state (see FIG. 9D).

Lock mechanism 30 according to Embodiment 1 has the following features individually or in an appropriately combination.

That is, lock mechanism 30 is a lock mechanism configured to hold a fitted state between cable-side connector 10 (first connector) and board-side connector 20 (second connector), where cable-side connector 10 and board-side connector 20 as a counterpart are fittable together, and includes: lock member 311 that includes engagement part 311*a* and is provided in cable-side connector 10; biasing part 311*c* that is connected to lock member 311 and holds lock member 311 in a reference state; boss 311*f* (pivotal shaft) that is disposed parallel to a pitch direction (the direction orthogonal to the fitting direction) of cable-side connector 10 and pivotably supports lock member 311; and engagement-receiving part 32 that is provided in board-side connector 20 and is engageable with engagement part 311*a*. Lock member 311 is attached to cable-side connector 10 so as to be pivotable around boss 311*f*.

According to lock mechanism 30, lock member 311 pivots along the XZ plane orthogonal to a mounting surface of connector set 1, and thus, there is no need to design a mounting space for a connector in view of the movable region of lock member 311 and it is possible to achieve a size reduction in the mounting space for the connector in the pitch direction. Further, since a space in which lock member 311 pivots can be ensured without increasing the height of cable-side connector 10, a height reduction in a connector is not compromised. Further, since lock mechanism 30 is not destroyed when the fitted state in connector set 1 is released, it is also possible to reuse lock mechanism 30.

In addition, lock mechanism 30 further includes removal operation member 312 that is connected to lock member 311 and is pullable in a removal direction orthogonal to the pitch direction (the extending direction of the pivotal shaft). A linear motion of removal operation member 312 in the removal direction is converted into a rotational motion around boss 311*f* (pivotal shaft) and the rotational motion is transmitted to lock member 311. That is, the linear motion of removal operation member 312 in the removal direction causes the first moment to rotate lock member 311 around boss 311*f* (pivotal shaft) to be generated. Thus, lock member 311 pivots in conjunction with a work of pulling removal operation member 312 to move cable-side connector 10 in the removal direction and remove cable-side connector 10 from board-side connector 20, and the engagement state with engagement-receiving part 32 is released. Accordingly, the workability at the time of the removal of the connector improves.

Further, in lock mechanism 30, lock member 311 is disposed in each of two side surfaces of cable-side connector 10 (first connector), where the two side surfaces faces each other in the pitch direction (the extending direction of the pivotal shaft), and removal operation member 312 couples two lock members 311. Thus, a fitted state between cable-side connector 10 and board-side connector 20 is firmly held by two lock members 311, and the engagements at the two locations can be easily released by an operation of pulling removal operation member 312.

Further, in lock mechanism 30, removal operation member 312 is a rigid body that is non-deformable with respect to a pulling operation. Thus, since a force that pulls removal operation member 312 is efficiently transmitted to lock member 311, it is possible to easily release the engagement between engagement part 311*a* and engagement-receiving part 32.

Further, in lock mechanism 30, lock member 311 includes removal member-attaching hole 311*g* to which removal operation member 312 (removal operation member) is connected, and a direction connecting removal member-attaching hole 311*g* and boss 311*f* (pivotal shaft) intersects the removal direction. Thus, when removal operation member 312 is pulled in the removal direction, it is possible to cause the first moment around boss 311*f* to be generated in lock member 311 to pivot lock member 311.

Further, in lock mechanism 30, biasing part 311*c* is formed of a portion of lock member 311, is deformed in association with pivoting of lock member 311, and generates a restoring force. That is, biasing part 311*c* is deformed in association with pivoting of lock member 311 and causes the second moment, which is opposite to the pivoting direction of lock member 311, to be generated in lock member 311. Thus, it is possible to simplify the configuration of holding lock member 311 in the reference state.

Further, in lock mechanism 30, biasing part 311*c* abuts on cover shell 12 (a component member of the first connector), and movement of biasing part 311*c* when lock member 311 pivots is regulated. Specifically, biasing part 311*c* includes the free end part, which abuts on cover shell 12 (a component member of the first connector), the fixed end part, which is connected to lock plate part 311*b* of lock member 311, and the arm part, which couples the free end part and the fixed end part. Thus, biasing part 311*c* is elastically deformed, and can easily generate a restoring force.

Further, in lock mechanism 30, engagement-receiving part 32 includes abutting surface 32*a* that abuts on engagement part 311*a* when cable-side connector 10 (first connector) is moved in an insertion direction opposite to the removal direction. Abutting surface 32*a* is formed to be inclined and allows engagement part 311*a* to be raised on abutting surface 32*a* such that lock member 311 pivots in association with movement of cable-side connector 10 in the insertion direction. Thus, it is possible to smoothly perform works at the time of insertion and removal in connector set 1.

Further, in lock mechanism 30, lock member 311 includes lock plate part 311*b* (plate part) having a sheet shape, and lock member 311 is disposed such that a sheet thickness direction of lock plate part 311*b* coincides with the pitch direction. Thus, there is no need to greatly enlarge the inner space of cable-side connector 10 for providing lock mechanism 30, and it is possible to achieve a size reduction in a connector.

Embodiment 2

Figure 10A:
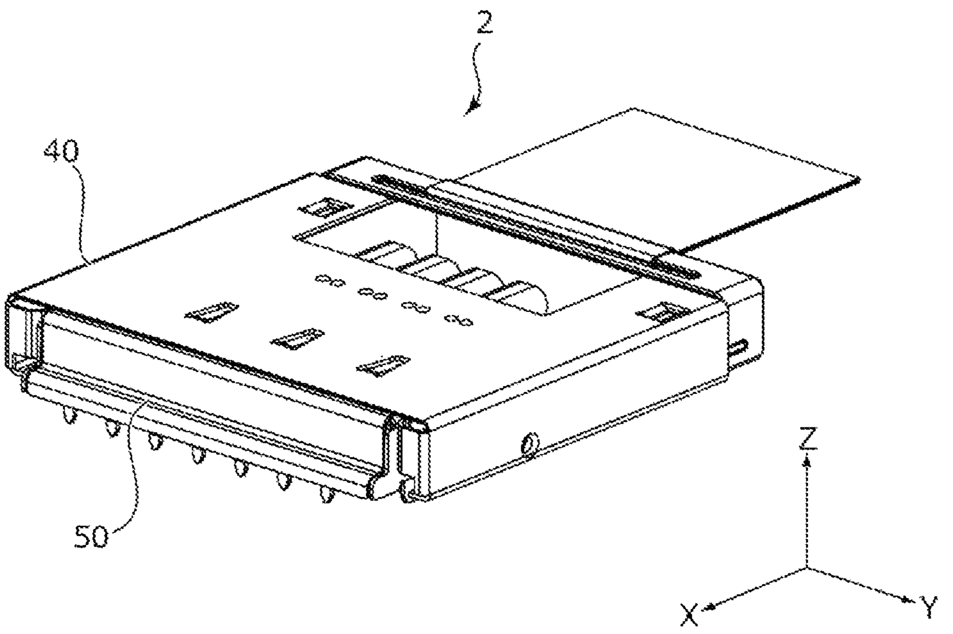
FIGS. 10A and 10B illustrate an external appearance of a connector set in a fitted state according to Embodiment 2 to which the present invention is applied.
Figure 10B:
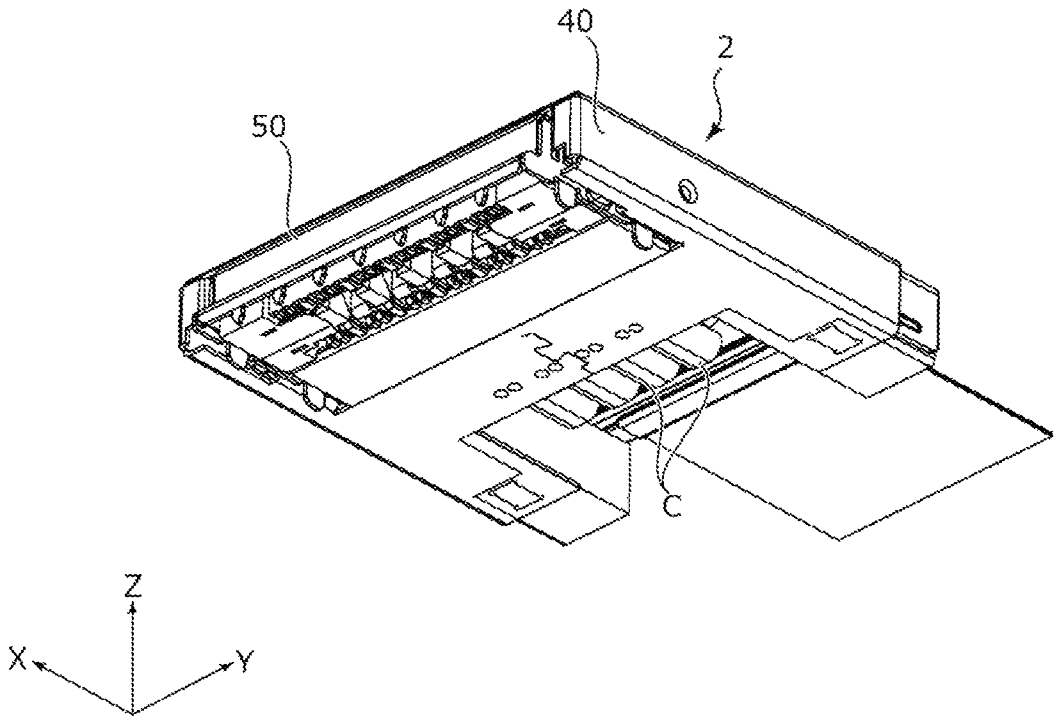
Figure 11A:
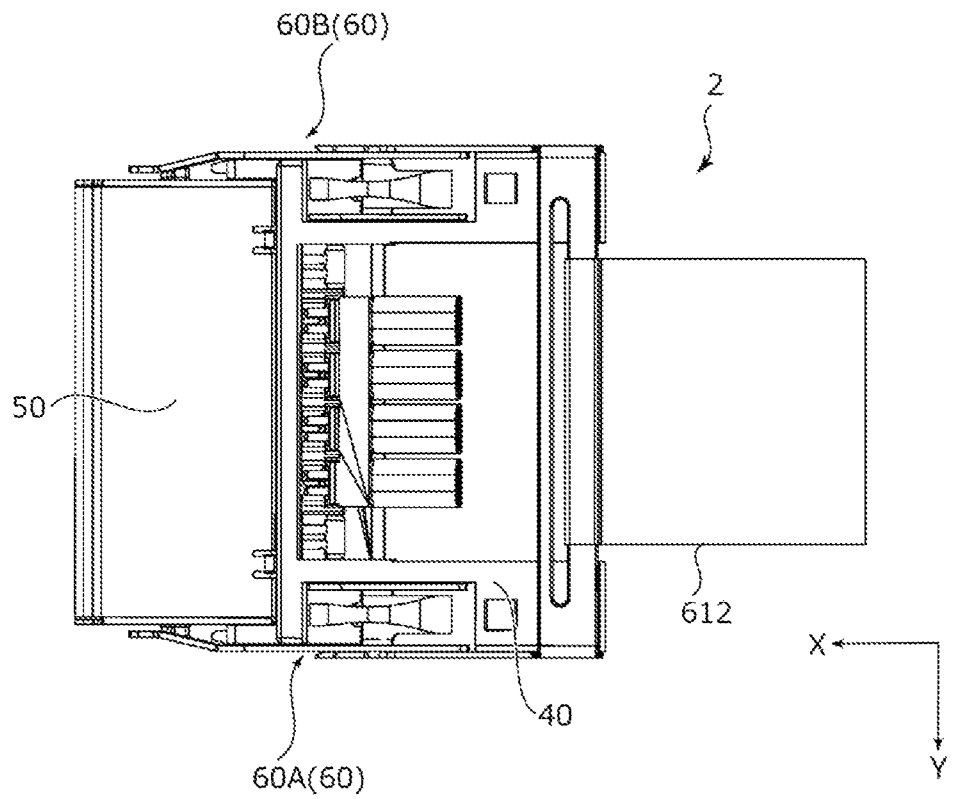
FIGS. 11A and 11B are a plan view and a side view of the connector set in the fitted state, respectively.
Figure 11B:
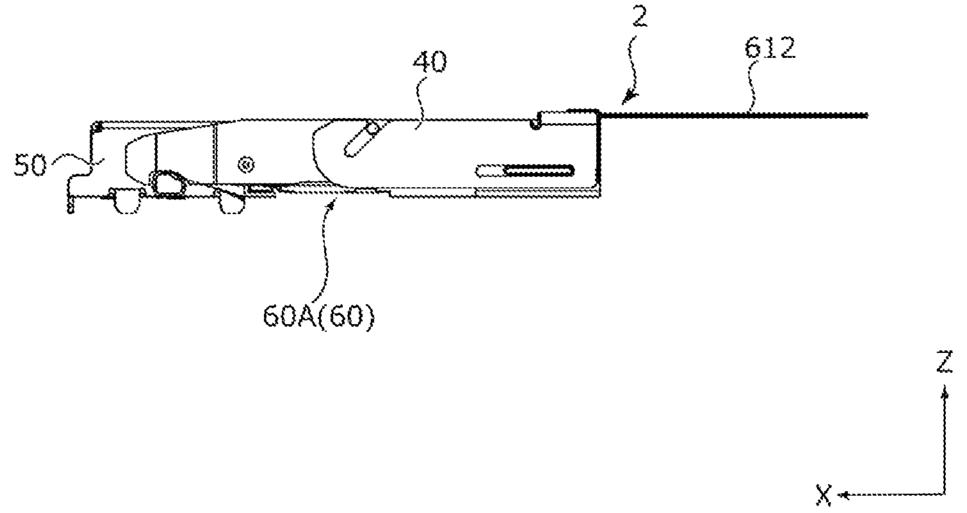

FIGS. 10A and 10B illustrate an external appearance of connector set 2 in a fitted state according to Embodiment 2 to which the present invention is applied. FIGS. 11A and 11B are a plan view and a side view of connector set 2 in the fitted state, respectively. In FIGS. 11A and 11B, cover shell 42 is omitted such that lock mechanism 60 inside connector set 2 appears in the drawings.

Figure 12:
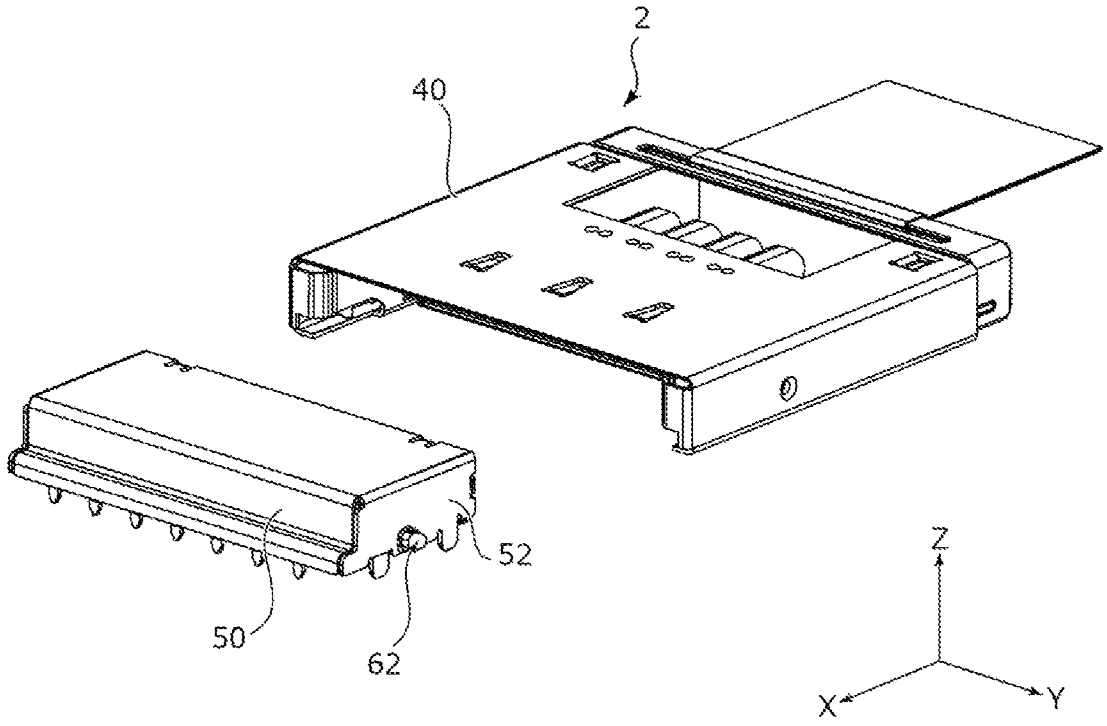
FIG. 12 illustrates an external appearance of the connector set in a non-fitted state.
Figure 13A:
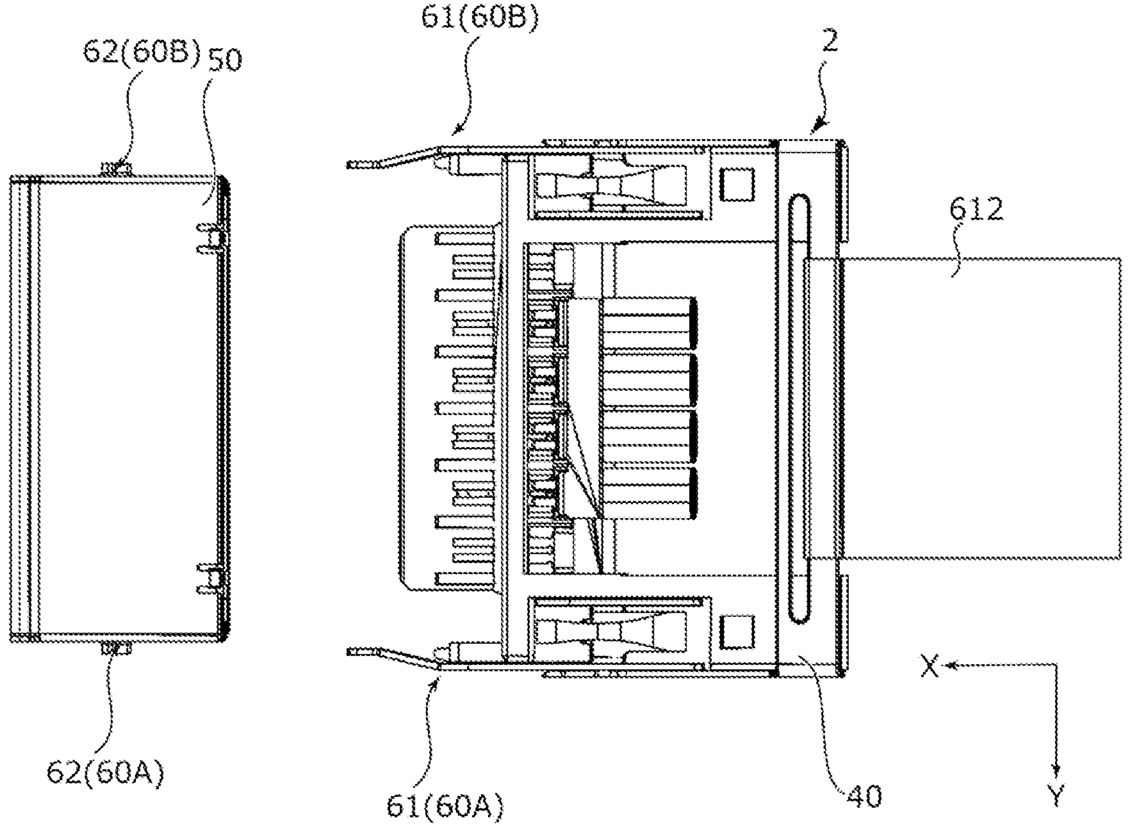
FIGS. 13A and 13B are a plan view and a side view of the connector set in the non-fitted state, respectively.
Figure 13B:
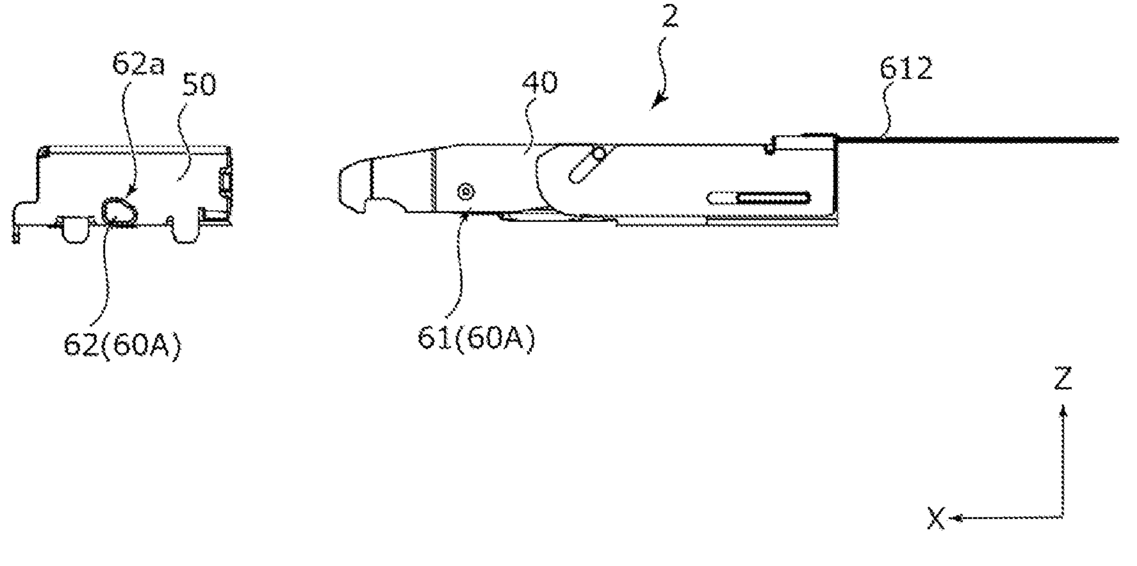

FIG. 12 illustrates an external appearance of connector set 2 in a non-fitted state. FIGS. 13A and 13B are a plan view and a side view of connector set 2 in the non-fitted state, respectively. In FIGS. 13A and 13B, cover shell 42 is omitted such that lock mechanism 60 inside connector set 2 appears in the drawings.

Connector set 2 in Embodiment 2 is mainly characterized by the structure of lock mechanism 60 and the main configurations of cable-side connector 40 and board-side connector 50 are almost the same as those of cable-side connector 10 and board-side connector 20 in Embodiment 1, and thus, a description thereof will be omitted or simplified.

Connector set 2 is a wire-to-board connector set of a horizontal fitting type, where the Y-axis direction is a pitch direction of connector set 2 and the X-axis direction is a fitting direction of connector set 2. The pitch direction is orthogonal to the fitting direction. The fitting direction includes an insertion direction toward the positive side in the X-axis direction and a removal direction toward the negative side in the X-axis direction. Connector set 2 is used, for example, when circuit boards are interconnected using cable C in an information device such as a server, a switch (network device), and a storage.

As illustrated in FIGS. 10A and 10B, or the like, connector set 2 includes cable-side connector 40, board-side connector 50, and lock mechanism 60. Cable-side connector is a connector to which cable C is connected, and board-side connector 50 is a connector that is mounted in a circuit board (not illustrated).

Cable C is, for example, a coaxial cable including an inner conductor (not illustrated) and an external shield layer (not illustrated) disposed outside the inner conductor via an insulator. The inner conductor of cable C is used, for example, for transmission of a high-speed (high-frequency) signal.

Cable C may be, for example, a Twinax cable in which two inner conductors are collectively covered with an insulator, an external shield layer, and a sheath. Further, for example, a flat cable such as a flexible flat cable (FFC) is also applicable to cable C.

Connector set 2 electrically connects cable C and a circuit board (not illustrated) by horizontal fitting between cable-side connector 40 and board-side connector 50.

Figure 14:
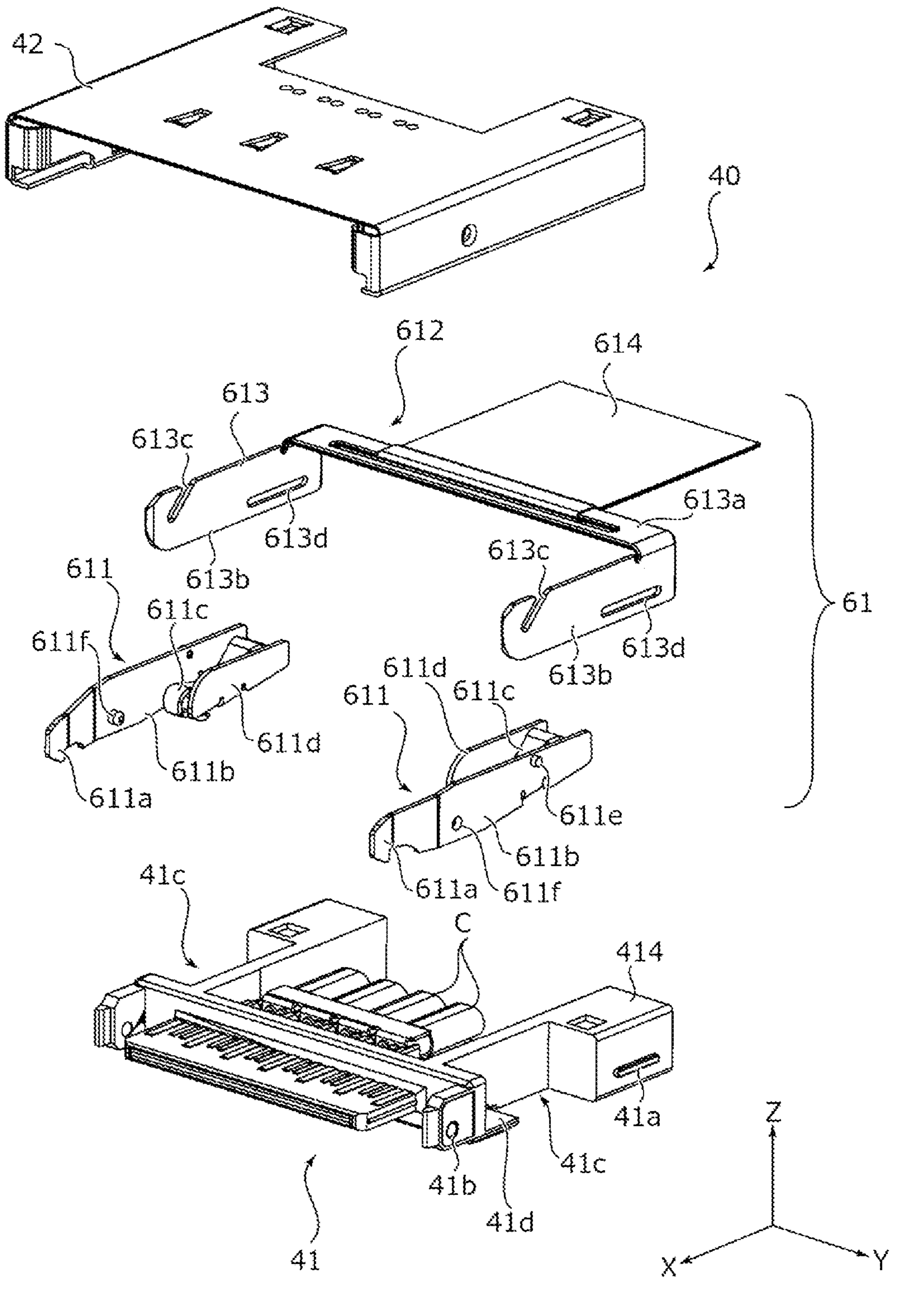
FIG. 14 is an exploded perspective view of a cable-side connector.

FIG. 14 is an exploded perspective view of cable-side connector 40.

As illustrated in FIG. 14, cable-side connector 40 includes cable-side connector body 41 and cover shell 42. Cables C are attached, in a state of being stacked in two stages, to cable-side connector body 41, for example.

Connector set 2 is provided with lock mechanism 60 for holding a fitted state between cable-side connector 40 and board-side connector 50. Lock mechanism 60 is formed of first lock mechanism 61 provided in cable-side connector 40 and second lock mechanism 62 provided in board-side connector 50.

Lock mechanism 60 is configured such that first lock mechanism 61 and second lock mechanism 62 mechanically engage with each other in conjunction with a work of inserting cable-side connector 40 into board-side connector 50 to cause cable-side connector and board-side connector 50 to be fitted together. Further, lock mechanism 60 is configured such that engagement between first lock mechanism 61 and second lock mechanism 62 is released in conjunction with a work of removing cable-side connector 40 from board-side connector 50 to release a fitted state therebetween.

In the present embodiment, lock mechanisms 60A and 60B are provided in the two side surfaces of connector set 2 along the XZ plane. Lock mechanisms 60A and 60B have the same configuration and are disposed so as to be plane-symmetrical with respect to the XZ plane.

Figure 15A:
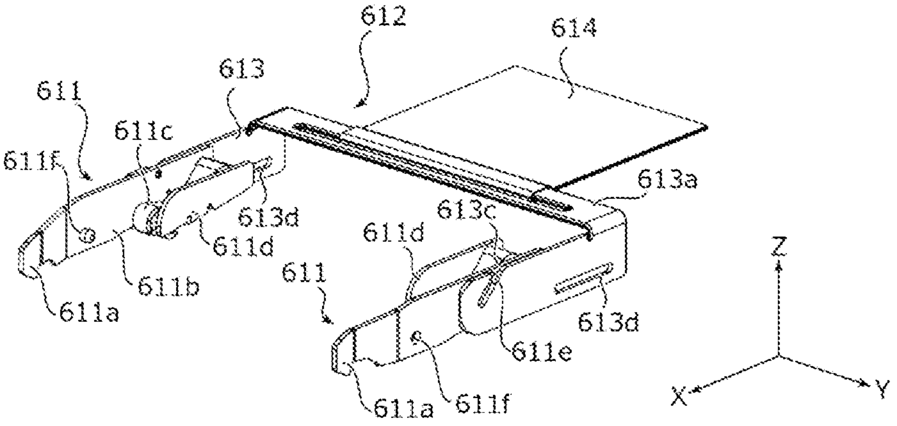
FIGS. 15A to 15C are a perspective view, a plan view, and a side view of a first lock mechanism, respectively.
Figure 15B:
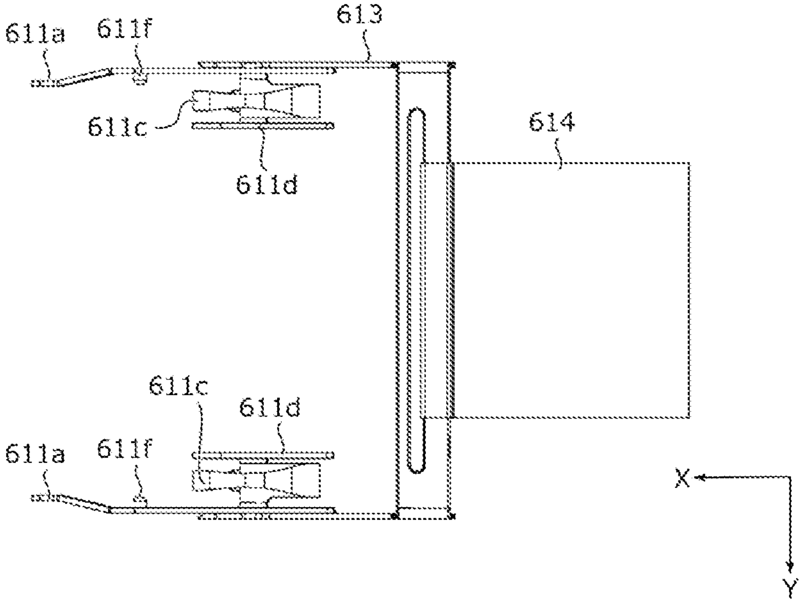
Figure 15C:
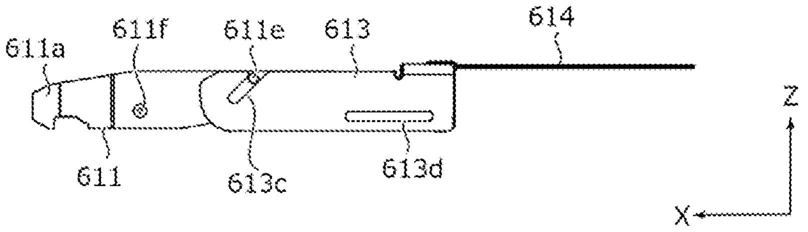

As illustrated in FIGS. 14 and 15A to 15C, first lock mechanism 61 provided in cable-side connector 40 includes lock member 611 and removal operation member 612. FIGS. 15A to 15C are a perspective view, a plan view, and a side view of first lock mechanism 61, respectively.

Removal operation member 612 is an operation portion that is operated by a worker when removing cable-side connector 40 from board-side connector 50. Removal operation member 612 includes, for example, coupling member 613 that is connected to lock member 611, and pull tab 614 that is connected to coupling member 613.

Coupling member 613 is preferably a rigid body that is non-deformable with respect to a pulling operation in the removal direction. Coupling member 613 is formed by, for example, sheet metal working (including punching and bending) of one metal sheet. Thus, it is possible to efficiently transmit a force, which pulls coupling member 613, to lock member 611 and to easily release engagement between first lock mechanism 61 and second lock mechanism 62.

Pull tab 614 is a portion that a worker grasps at the time of removal and is formed of, for example, a resin sheet having flexibility. Thus, when connector set 2 is mounted in the circuit board, pull tab 614 can be easily retracted so as not to interfere with other mounting components, and thus, it is possible to achieve a size reduction in the mounting space.

Coupling member 613 includes, for example, flat part 613*a*, which extends along the XY plane, and side surface part 613*b*, which is formed to vertically suspend from flat part 613*a* and so as to extend in the X-axis direction. Plate-attaching slit 613*c* and guide piece-engaging hole 613*d* are provided in each of two side surface parts 613*b*.

Plate-attaching slit 613*c* is a portion into which removal member-attaching piece 611*e* of lock member 611 is fitted. Plate-attaching slit 613*c* is formed at an upper end edge of side surface part 613*b* so as to be downwardly inclined toward the positive side in the X-axis direction. Plate-attaching slit 613*c* abuts on removal member-attaching piece 611*e* at least on an inclined surface of plate-attaching slit 613*c* on the positive side in the X-axis direction (the side opposite to the removal direction). Thus, the first moment is generated in association with movement of removal operation member 612 to the negative side in the X-axis direction and lock member 611 pivots to the positive side in the Z-axis direction.

Guide piece-engaging hole 613*d* is a portion into which guide piece 41*a* of cable-side connector body 41 is fitted. Guide piece-engaging hole 613*d* is formed to be longer than guide piece 41*a* in the X-axis direction. Guide piece-engaging hole 613*d* is fitted into guide piece 41*a* and regulates the movement direction of removal operation member 612. Guide piece 41*a* is formed in, for example, cable-side insulator 414 so as to extend along the X-axis direction. That is, cable-side connector body 41 (for example, cable-side insulator 414) including guide piece 41*a* functions as a guide member that guides a removal operation of removal operation member 612, and partially forms first lock mechanism 61. Note that, a guide member may also be provided separately from cable-side connector body 41.

Lock member 611 is a member formed by, for example, sheet metal working (including punching and bending) of one metal sheet. Lock member 611 is disposed in lock member-housing part 41*c* formed in each of the two side surfaces of cable-side connector body 41 along the XZ plane.

Each of two lock members 611 in lock mechanisms 60A and 60B is connected to coupling member 613 and is held between cable-side connector body 41 and coupling member 613. That is, two lock members 611 are coupled by removal operation member 612 and are configured such that two lock members 611 move together in conjunction with an operation of pulling removal operation member 612 in the removal direction (the negative side in the X-axis direction).

Lock member 611 includes engagement part 611*a*, lock plate part 611*b*, biasing part 611*c*, and inner-side plate part 611*d*.

Engagement part 611*a* is a portion that engages with second lock mechanism 62 (see FIGS. 13A and 13B) provided in board-side connector 50. Engagement part 611*a* is disposed, for example, at the leading-end of lock plate part 611*b* on the positive side in the X-axis direction. Engagement part 611*a* has a hook shape and engages with second lock mechanism 62 to regulate the movement of lock member 611 to the negative side in the X-axis direction.

Lock plate part 611*b* is a portion that is attached to cable-side connector body 41. Lock plate part 611*b* extends along the X-axis direction, and engagement part 611*a* is disposed at the leading-edge of lock plate part 611*b*. In lock plate part 611*b*, removal member-attaching piece 611*e* and boss 611*f* are formed.

Biasing part 611*c* has a function of holding lock member 611 in a reference state. Biasing part 611*c* is a portion that generates, when lock member 611 pivots from the reference state and is displaced, a restoring force for returning lock member 611 to the reference state. Biasing part 611*c* includes a free end part on a side of the leading-end of biasing part 611*c*, which abuts on spring-receiving part 41*d* of cable-side connector 40, a fixed end part, which is connected to lock plate part 611*b* and inner-side plate part 611*d*, and an arm part, which couples the free end part and the fixed end part (reference signs thereof are omitted). Biasing part 611*c* is formed between lock plate part 611*b* and inner-side plate part 611*d* by bending, for example. Biasing part 611*c* is a leaf spring formed to be bent such that a predetermined restoring force is generated by elastic deformation. The "reference state" refers to a state in which no external force (for example, a tensile force when removal operation member 612 is pulled in the removal direction) acts on lock member 611.

Boss 611*f* is a portion that is fitted into boss-receiving recessed part 41*b* of cable-side connector body 41. Boss 611*f* is formed along the Y-axis direction toward a side of cable-side connector body 41. Boss 611*f* is pivotably fitted into boss-receiving recessed part 41*b* and functions as a pivotal shaft when lock member 611 pivots. Boss-receiving recessed part 41*b* is formed in, for example, cable-side insulator 414. That is, cable-side connector body 41 (for example, cable-side insulator 414) including boss-receiving recessed part 41*b* partially forms first lock mechanism 61.

Removal member-attaching piece 611*e* is a portion that engages with plate-attaching slit 613*c* of coupling member 613. When removal operation member 612 is pulled to the negative side in the X-axis direction, a tensile force acts on the portion of removal member-attaching piece 611*e*. Removal member-attaching piece 611*e* engages with plate-attaching slit 613*c* such that the first moment is generated in lock member 611. Here, when lock member 611 is in the reference state, removal member-attaching piece 611*e* is located on the positive side of boss 611*f* in the Z-axis direction. That is, in the reference state of lock member 611, the position of removal member-attaching piece 611*e* in the Z-axis direction is different from the position of boss 611*f* in the Z-axis direction.

In cable-side connector 40, lock member 611 is disposed in each of the two side surfaces of cable-side connector body 41 along the XZ plane. Specifically, boss 611*f* of lock member 611 is fitted into boss-receiving recessed part 41*b* of cable-side connector body 41. In this state, plate-attaching slit 613*c* of coupling member 613 is connected to removal member-attaching piece 611*e* of lock member 611. Removal member-attaching piece 611*e* and plate-attaching slit 613*c* form a cam that converts a linear motion in the removal direction into a rotational motion around boss 611*f* (pivotal shaft) and transmits the rotational motion to lock member 611. Further, cover shell 42 is attached to cable-side connector body 41. In this way, lock member 611 is held in a predetermined attitude so as not to fall off from cable-side connector 40.

At this time, removal member-attaching piece 611*e* of lock member 611 engages with plate-attaching slit 613*c* of coupling member 613, and thus, pivoting of lock member 611 such that engagement part 611*a* is displaced to the positive side in the Z-axis direction is regulated. Further, the free end part of biasing part 611*c* abuts on spring-receiving part 41*d* of cable-side connector body 41, and thus, pivoting of lock member 611 such that engagement part 611*a* is displaced to the negative side in the Z-axis direction is regulated. This state is the "reference state" of lock member 611.

Further, in the reference state, biasing part 611*c* is preferably biased in the counterclockwise direction (so-called preload), that is, the second moment is preferably caused to be generated in lock member 611. Since the attitude of lock member 611 is stabilized by the biasing force of biasing part 611*c*, it is possible to surely hold a locked state in the fitted state (see FIG. 17A) and it is possible to prevent lock member 611 from rattling in the non-fitted state (see FIG. 16A).

Second lock mechanism 62 provided in board-side connector 50 is an engagement-receiving part (hereinafter referred to as "engagement-receiving part 62") that engages with engagement part 611*a* of lock member 611 and regulates the movement of lock member 611 in the X-axis direction. The configuration of engagement-receiving part 62 is the same as in Embodiment 1.

That is, engagement-receiving part 62 is provided in, for example, on each of the side surfaces of board-side shell 52 of board-side connector 50 along the XZ plane (see FIG. 12). The position of engagement-receiving part 62 in the Z-axis direction is comparable to the position of engagement part 611*a* of lock member 611 in the reference state.

Engagement-receiving part 62 includes abutting surface 62*a* that abuts on engagement part 611*a* of lock member 611 in association with movement of lock member 611 to the positive side in the X-axis direction. Abutting surface 62*a* is formed to be inclined such that engagement part 611*a* of lock member 611 is displaced to the positive side in the Z-axis direction and is raised on abutting surface 62*a* in association with movement of lock member 611 in the insertion direction (to the positive side in the X-axis direction).

Even in Embodiment 2, lock member 611 pivots in conjunction with an operation of inserting cable-side connector 40 into board-side connector 50, and engagement part 611*a* and engagement-receiving part 62 mechanically engage with each other. Further, lock member 611 pivots in conjunction with an operation of removing cable-side connector 40 from board-side connector 50, and the engagement between engagement part 611*a* and engagement-receiving part 62 is released.

FIGS. 16A to 16D illustrate a state transition of lock mechanism 60 at the time of a work of inserting cable-side connector 40 into board-side connector 50.

Figure 16A:
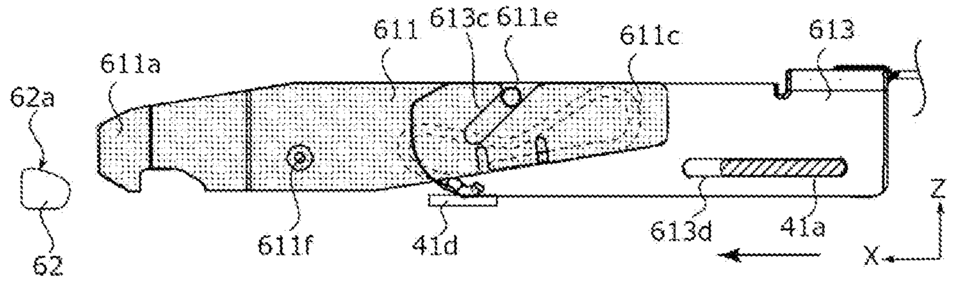
FIGS. 16A to 16D illustrate a state transition of a lock mechanism at the time of a work of inserting the cable-side connector into a board-side connector.
Figure 16B:
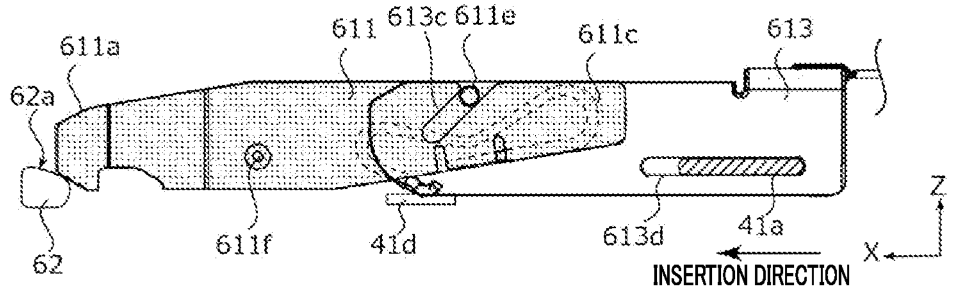
Figure 16C:
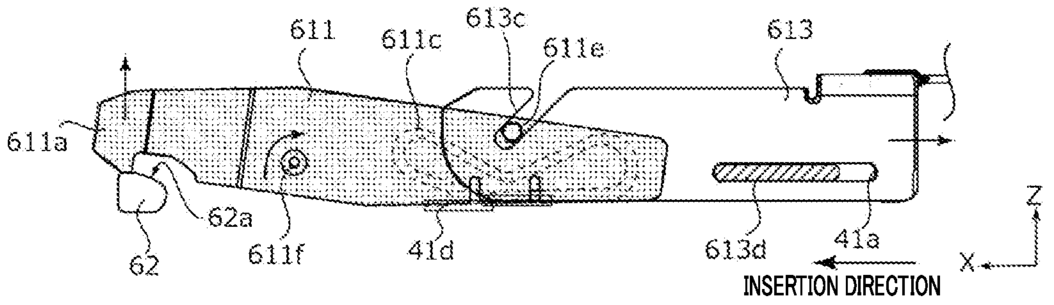
Figure 16D:
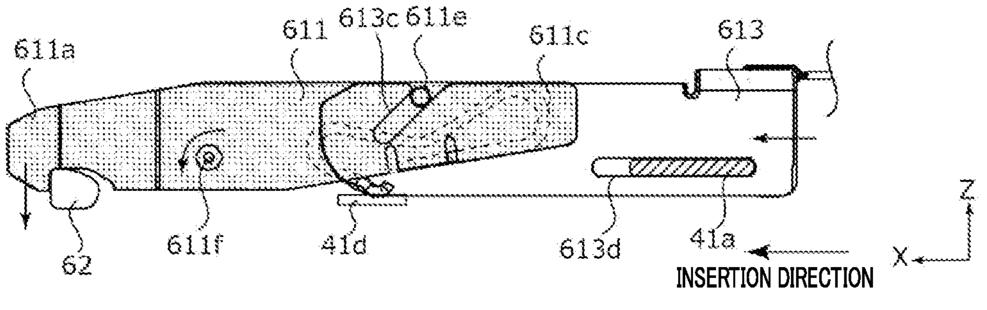

In a case where cable-side connector 40 is fitted into board-side connector 50, a worker first adjusts the positions thereof in the Z-axis direction such that the fitting portions of cable-side connector 40 and board-side connector 50 match (see FIG. 16A). At this time, lock member 611 is in the reference state and is in a state of being difficult to pivot. That is, in the reference state in which no external force is applied to lock member 611, lock member 611 is in a stable state in which lock member 611 hardly pivots both clockwise and counterclockwise.

Next, cable-side connector 40 is moved to the positive side in the X-axis direction with respect to board-side connector 50. Lock member 611 is maintained in the reference state until engagement part 611*a* reaches engagement-receiving part 62 (see FIG. 16B). Note that, in lock mechanism 60, when removal operation member 612 (specifically, coupling member 613) is grasped and cable-side connector 40 is moved, lock member 611 interferes with removal operation member 612 when lock member 611 pivots. Accordingly, the work of inserting cable-side connector 40 is performed while grasping cover shell 42.

Further, when a force to the positive side in the X-axis direction is applied to cable-side connector 40, engagement part 611*a* is raised on abutting surface 62*a* of engagement-receiving part 62 to the positive side in the Z-axis direction, and the first moment is generated in lock member 611. Lock member 611 pivots around boss 611*f* clockwise as viewed from the positive side in the Y-axis direction (see FIG. 16C). At this time, a portion of biasing part 611*c*, which abuts on spring-receiving part 41*d*, cannot move (pivot), and thus, a restoring force is generated by elastic deformation. In lock member 611, the second moment is generated by the restoring force of biasing part 611*c*.

Further, when lock member 611 pivots, removal member-attaching piece 611*e* of lock member 611 moves to the negative side in the Z-axis direction. Since removal member-attaching piece 611*e* moves along plate-attaching slit 613*c* of coupling member 613, removal operation member 612 including coupling member 613 is pushed in the direction opposite to the insertion direction. In a case where cover shell 42 is grasped and cable-side connector 40 is inserted, removal operation member 612 is movable with respect to cable-side connector 40 and therefore moves to the negative side in the X-axis direction.

Further, when a force to the positive side in the X-axis direction is applied to cable-side connector 40, engagement part 611*a* passes over abutting surface 62*a* of engagement-receiving part 62. Due to the restoring force generated in biasing part 611*c*, lock member 611 pivots around boss 611*f* counterclockwise as viewed from the positive side in the Y-axis direction and returns to the reference state (see FIG. 16D).

Engagement-receiving part 62 provided in board-side connector 50 and engagement part 611*a* of lock member 611 provided in cable-side connector 40 mechanically engage with each other, and connector set 2 is held in a non-removable state to an external force of a predetermined value or lower.

FIGS. 17A to 17D illustrate a state transition of lock mechanism 60 at the time of a work of removing cable-side connector 40 from board-side connector 50.

Figure 17A:
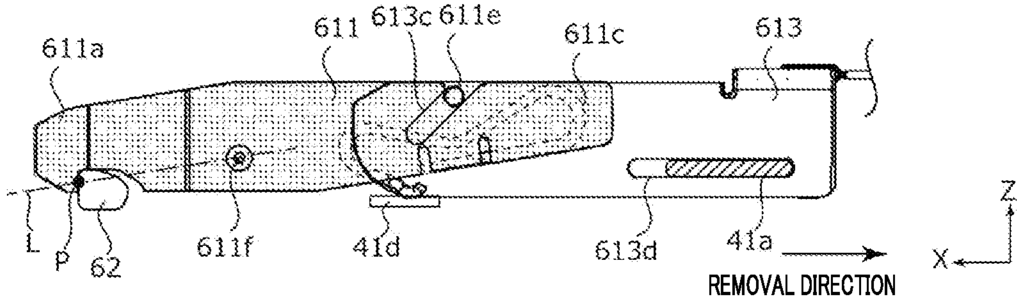
FIGS. 17A to 17D illustrate a state transition of the lock mechanism at the time of a work of removing the cable-side connector from the board-side connector.

In a state in which board-side connector 50 and cable-side connector 40 are fitted together, engagement-receiving part 62 provided in board-side connector 50 and engagement part 611*a* of lock member 611 provided in cable-side connector 40 mechanically engage with each other, and connector set 2 is held in a non-removable state to an external force of a predetermined value or lower (see FIG. 17A).

In a case where cable-side connector 40 is removed from board-side connector 50, a worker pulls pull tab 614 (removal operation member 612) to the negative side in the X-axis direction. The tensile force on pull tab 614 is transmitted to lock member 611 via coupling member 613. Specifically, when pull tab 614 is pulled in the removal direction, coupling member 613 moves along guide piece 41*a* and the tensile force is transmitted from an inclined surface of plate-attaching slit 613*c* (the surface thereof on the positive side in the X-axis direction, which abuts on removal member-attaching piece 611*e*) to removal member-attaching piece 611*e*. At this time, a linear motion of removal operation member 612 due to the tensile force is converted into a rotational motion of lock member 611.

In lock member 611, the positions of boss 611*f* and removal member-attaching piece 611*e* in the Z-axis direction are different, and a direction connecting boss 611*f* and removal member-attaching piece 611*e* intersects the direction of the tensile force. Accordingly, in lock member 611, the first moment is generated with boss 611*f* as a fulcrum (pivotal shaft) and removal member-attaching piece 611*e* as a point where a force is applied. As the first moment is generated in lock member 611, engagement part 611*a* is going to be displaced to the positive side in the Z-axis direction.

At this time, the reaction force (second moment) due to biasing part 611*c* increases in association with the operation of pulling removal operation member 612. When the tensile force exceeds the reaction force of biasing part 611*c*, that is, when the first moment exceeds the second moment, lock member 611 starts a rotational motion.

Further, boss 611*f* is located more on the positive side in the Z-axis direction than engagement point P (the contact point at which engagement-receiving part 62 comes into contact with engagement part 611*a*), and straight line L connecting boss 611*f* and engagement point P intersects the removal direction. Straight line L coincides with the direction in which the removal direction is rotated 0 to 45° counterclockwise. In this case, the rotation locus of engagement point P and engagement-receiving part 62 do not interfere, and thus, engagement part 611*a* is pivotable.

Figure 17B:
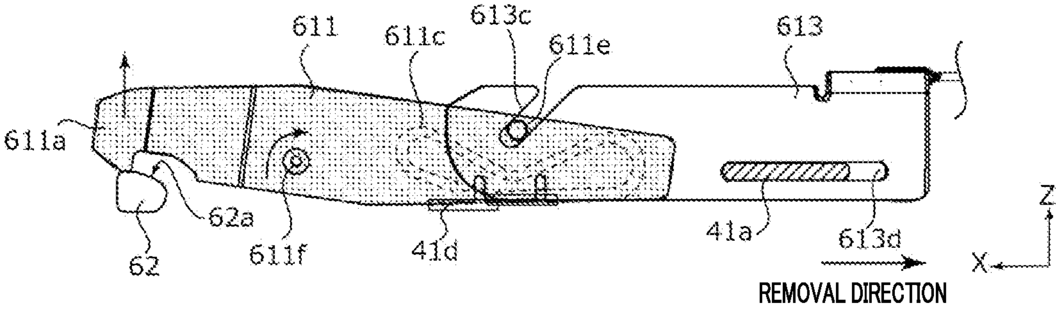

Accordingly, lock member 611 smoothly pivots around boss 611*f* clockwise as viewed from the positive side in the Y-axis direction, and engagement part 611*a* rises up on engagement-receiving part 62 (see FIG. 17B). At this time, the portion of biasing part 611*c*, which abuts on spring-receiving part 41*d* of cable-side connector body 41, cannot move (pivot), and thus, a restoring force is generated by elastic deformation. In lock member 611, the second moment is generated by the restoring force of biasing part 611*c*. Since plate-attaching slit 613*c* is downwardly inclined toward the positive side in the X-axis direction (the side opposite to the removal direction), lock member 611 can pivot smoothly.

Figure 17C:
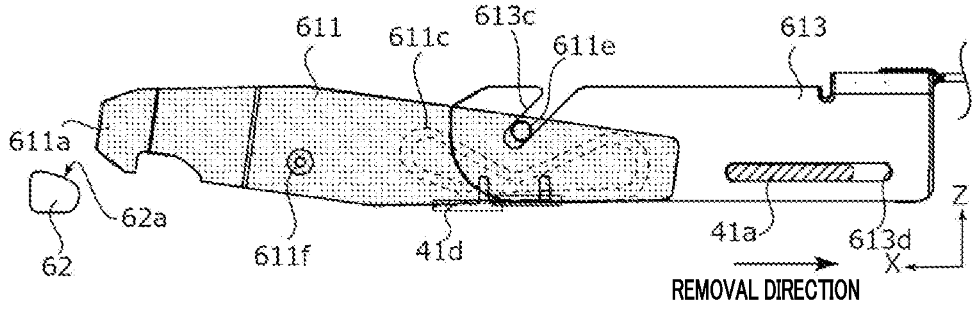

When pull tab 614 (removal operation member 612) is further pulled to the negative side in the X-axis direction, engagement part 611*a* and engagement-receiving part 62 are completely separated from each other (see FIG. 17C).

Figure 17D:
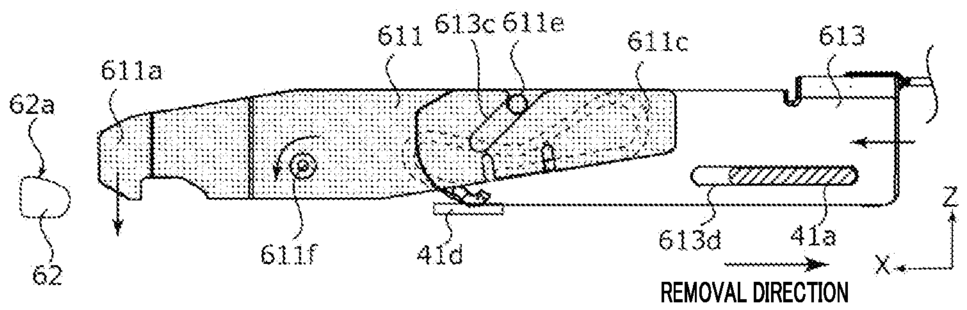

When pull tab 614 that has been grasped is released in this state, the restoring force generated in biasing part 611*c* causes lock member 611 to pivot around boss 611*f* counter clockwise as viewed from the positive side in the Y-axis direction and returns to the reference state (see FIG. 17D). At this time, removal member-attaching piece 611*e* of lock member 611 moves to the positive side in the Z-axis direction. Since removal member-attaching piece 611*e* moves along plate-attaching slit 613*c* of coupling member 613, removal operation member 612 including coupling member 613 is pushed in the direction opposite to the removal direction. Removal operation member 612 is movable with respect to cable-side connector 40 and therefore moves to the positive side in the X-axis direction.

Lock mechanism 60 according to Embodiment 2 has the following features individually or in an appropriately combination.

That is, lock mechanism 60 is a lock mechanism configured to hold a fitted state between cable-side connector 40 (first connector) and board-side connector 50 (second connector), where cable-side connector 40 and board-side connector 50 as a counterpart are fittable together, and includes: lock member 611 that includes engagement part 611*a* and is provided in cable-side connector 40; biasing part 611*c* that is connected to lock member 611 and holds lock member 611 in a reference state; boss 611*f* (pivotal shaft) that is disposed parallel to a pitch direction (the direction orthogonal to the fitting direction) of cable-side connector 40 and pivotably supports lock member 611; and engagement-receiving part 62 that is provided in board-side connector 50 and is engageable with engagement part 611*a*. Lock member 611 is attached to cable-side connector 40 so as to be pivotable around boss 611*f*.

According to lock mechanism 60, lock member 611 pivots along the XZ plane orthogonal to a mounting surface of connector set 2, and thus, there is no need to design a mounting space for a connector in view of the movable region of lock member 611 and it is possible to achieve a size reduction in the mounting space for the connector in the pitch direction. Further, since a space in which lock member 611 pivots can be ensured without increasing the height of cable-side connector 40, a height reduction in a connector is not compromised. Further, since lock mechanism 60 is not destroyed when the fitted state in connector set 2 is released, it is also possible to reuse lock mechanism 60.

In addition, lock mechanism 60 further includes removal operation member 612 that is connected to lock member 611 and is pullable in a removal direction orthogonal to the pitch direction (the extending direction of the pivotal shaft). A linear motion of removal operation member 612 in the removal direction is converted into a rotational motion around boss 611*f* (pivotal shaft) and the rotational motion is transmitted to lock member 611. That is, the linear motion of removal operation member 612 in the removal direction causes the first moment to rotate lock member 611 around boss 611*f* (pivotal shaft) to be generated. Thus, lock member 611 pivots in conjunction with a work of pulling removal operation member 612 to move cable-side connector 40 in the removal direction and remove cable-side connector 40 from board-side connector 50, and the engagement state with engagement-receiving part 62 is released. Accordingly, the workability at the time of the removal of the connector improves.

Further, in lock mechanism 60, lock member 611 is disposed in each of two side surfaces of cable-side connector 40 (first connector), where the two side surfaces faces each other in the pitch direction (the extending direction of the pivotal shaft), and coupling member 613 (removal operation member) couples two lock members 611. Thus, a fitted state between cable-side connector 40 and board-side connector 50 is firmly held by two lock members 611, and the engagements at the two locations can be easily released by an operation of pulling coupling member 613.

Further, in lock mechanism 60, coupling member 613 (removal operation member) is a rigid body that is non-deformable with respect to a pulling operation. Thus, since a force that pulls coupling member 613 is efficiently transmitted to lock member 611, it is possible to easily release the engagement between engagement part 611*a* and engagement-receiving part 62.

Further, in lock mechanism 60, lock member 611 includes removal member-attaching piece 611*e* (removal member-attaching part) to which coupling member 613 (removal operation member) is connected, and a direction connecting removal member-attaching piece 611*e* and boss 611*f* (pivotal shaft) intersects the removal direction. Thus, when coupling member 613 is pulled in the removal direction, it is possible to cause the first moment around boss 611*f* to be generated in lock member 611 to pivot lock member 611. Note that, in a case where lock member 611 is pivoted by using a cam as in Embodiment 2, the direction connecting removal member-attaching piece 611*e* and boss 611*f* (pivotal shaft) may not intersect the removal direction.

Further, in lock mechanism 60, biasing part 611*c* is formed of a portion of lock member 611, is deformed in association with pivoting of lock member 611, and generates a restoring force. That is, biasing part 611*c* is deformed in association with pivoting of lock member 611 and causes the second moment, which is opposite to the pivoting direction of lock member 611, to be generated in lock member 611. Thus, it is possible to simplify the configuration of holding lock member 611 in the reference state.

Further, in lock mechanism 60, biasing part 611*c* abuts on spring-receiving part 41*d* (a component member of the first connector) of cable-side connector body 41, and movement of biasing part 611*c* when lock member 611 pivots is regulated. Specifically, biasing part 611*c* includes the free end part, which abuts on spring-receiving part 41*d* (a component member of the first connector), the fixed end part, which is connected to lock plate part 611*b* and inner-side plate part 611*d* (plate part) of lock member 611, and the arm part, which couples the free end part and the fixed end part. Thus, biasing part 611*c* is elastically deformed, and can easily generate a restoring force.

Further, in lock mechanism 60, engagement-receiving part 62 includes abutting surface 62*a* that abuts on engagement part 611*a* when cable-side connector 40 (first connector) is moved in an insertion direction opposite to the removal direction. Abutting surface 62*a* is formed to be inclined and allows engagement part 611*a* to be raised on abutting surface 62*a* such that lock member 611 pivots in association with movement of cable-side connector 40 in the insertion direction. Thus, it is possible to smoothly perform works at the time of insertion and removal in connector set 2.

Further, in lock mechanism 60, lock member 611 includes lock plate part 611*b* (plate part) having a sheet shape, and lock member 611 is disposed such that a sheet thickness direction of lock plate part 611*b* coincides with the pitch direction. Thus, there is no need to greatly enlarge the inner space of cable-side connector 40 for providing lock mechanism 60, and it is possible to achieve a size reduction in a connector.

Further, in lock mechanism 60, removal operation member 612 includes plate-attaching slit 613*c* (inclined surface) formed to be inclined with respect to the removal direction, lock member 611 includes removal member-attaching piece 611*e* (engagement piece) that engages with plate-attaching slit 613*c*, and a cam is formed by engagement between plate-attaching slit 613*c* and removal member-attaching piece 611*e*, where the cam converts a linear motion of removal operation member 612 into a rotational motion and transmits the rotational motion to lock member 611. Thus, the linear motion of removal operation member 612 can be efficiently converted into the rotational motion and the rotational motion can be transmitted to lock member 611.

Although the invention made by the present inventors has been specifically described above based on the embodiments, the present invention is not limited to the above-described embodiments and modification may be made without departing from the gist thereof.

For example, the structures of small portions of cable-side connector 10 and board-side connector 20 are not limited to the examples described in Embodiment 1 and may be modified as appropriate. Further, the number of cables C may also be modified as appropriate.

In Embodiment 1, connector set 1 as a wire-to-board connector set has been described, but the present invention is also applicable to a wire-to-wire connector set.

Further, although Embodiment 1 is configured such that lock member 311 is pivoted by utilizing removal operation member 312 at the time of removal, an operation part for pivoting lock member 311 may be separately provided instead of removal operation member 312. For example, lock member 311 may be provided with an operation piece integrally, and this operation piece may be grasped and lock member 311 may be pivoted directly.

Further, although two lock members 311 are coupled by removal operation member 312 in Embodiment 1, different removal operation members 312 may be connected to two lock members 311, respectively. Further, removal operation member 312 may be formed of a member having flexibility (for example, a member having a string shape).

Further, the structure for pivotally supporting lock member 311 with respect to cable-side connector body 11 is not limited to the example described in the embodiments. For example, cable-side connector body 11 may be provided with a protrusion part serving as a pivotal shaft and lock member 311 may be provided with an engagement hole into which the protrusion part is fitted.

Further, although biasing part 311*c* is formed as a portion of lock member 311 in Embodiment 1, the biasing part that holds lock member 311 in the reference state may be formed of a separate member (for example, a compression coil spring, or the like) from lock member 311.

The above-described variations to Embodiment 1 are also applicable to Embodiment 2. Further, the following variation is also applicable to Embodiment 2.

Figure 18A:
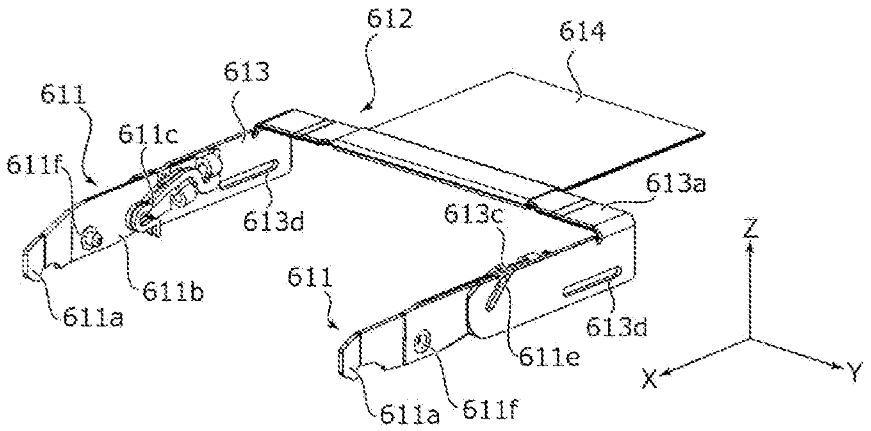
FIGS. 18A to 18C illustrate a variation of the first lock mechanism.
Figure 18B:
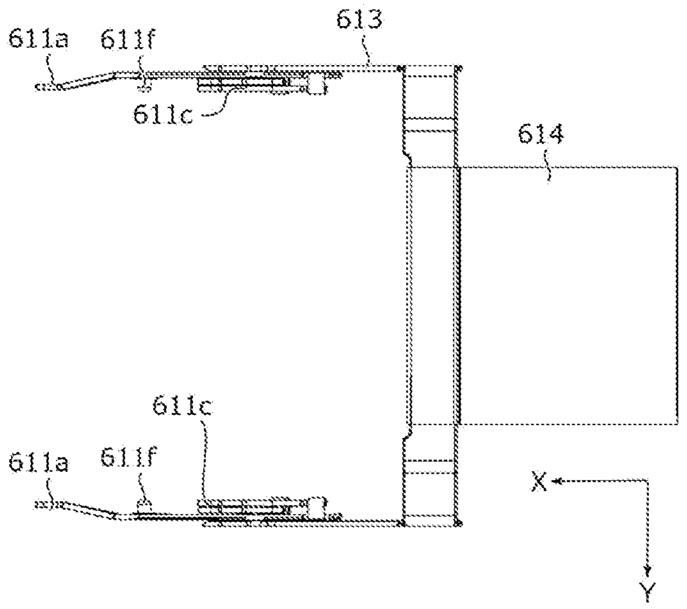
Figure 18C:
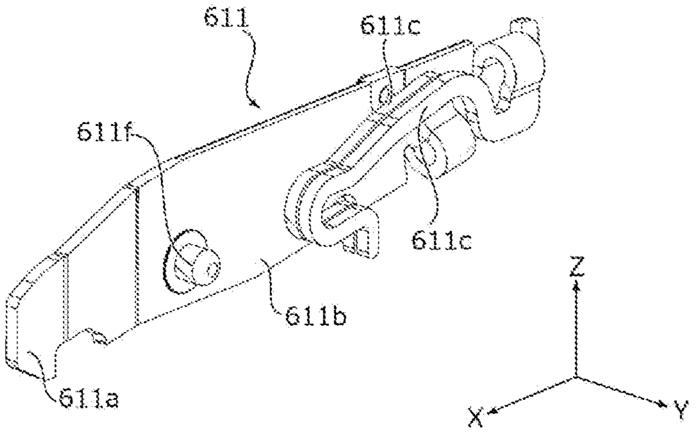

Further, the structure as illustrated in FIGS. 18A to 18C may be applied as biasing part 611*c* of lock member 611 in Embodiment 2. That is, as illustrated in FIGS. 18A to 18C, a plurality of (for example, two) biasing parts 611*c* may be formed integrally with lock member 611 such that a sheet thickness direction of biasing parts 611*c* coincides with the pitch direction. In this case, it is possible to achieve a size reduction in a connector by reducing the width thereof in the pitch direction and it is also possible to increase the elastic force of biasing parts 611*c* easily.

Figure 19A:
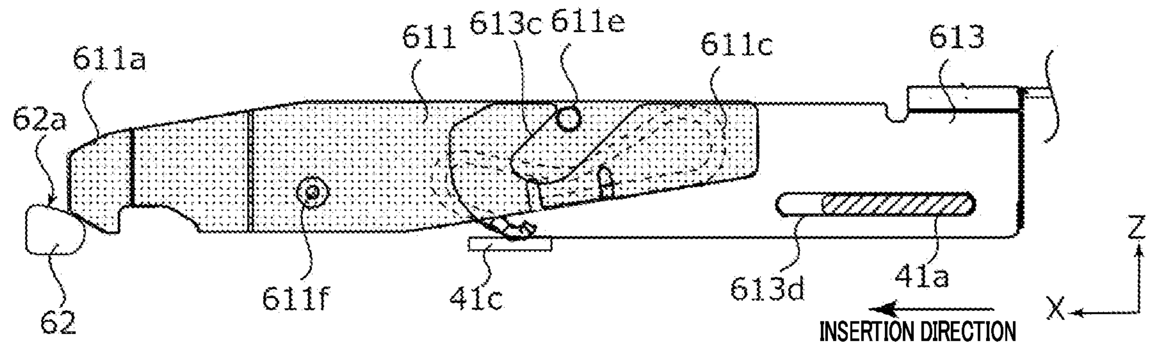
FIGS. 19A and 19B illustrate a variation of the first lock mechanism.
Figure 19B:
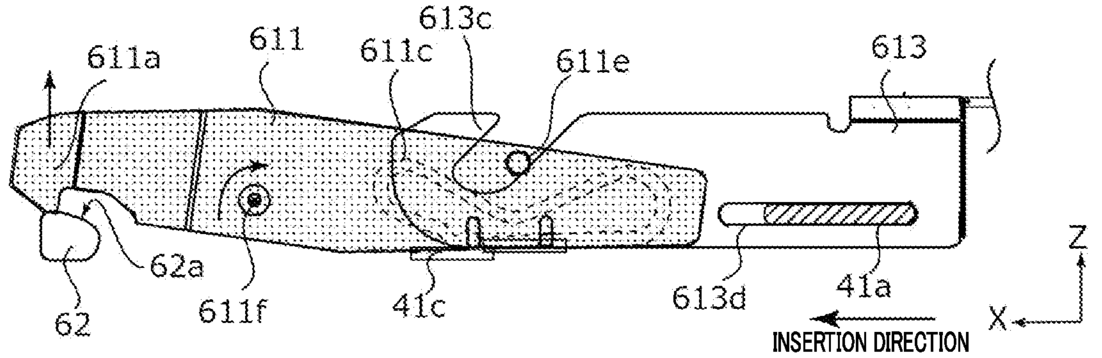

Further, plate-attaching slit 613*c* formed in lock member 611 may have the structure as illustrated in FIGS. 19A and 19B. That is, plate-attaching slit 613*c* may have an inclined surface that abuts on removal member-attaching piece 611*e* when removal operation member 612 is pulled in the removal direction. In the case of the structure illustrated in FIGS. 19A and 19B, when lock member 611 pivots in association with a work of inserting cable-side connector 40, removal member-attaching piece 611*e* can move within the region of plate-attaching slit 613*c* and lock member 611 and coupling member 613 do not interfere with each other. Accordingly, it is also possible to grasp removal operation member 612 and perform a work of inserting cable-side connector 40.

Embodiment 3

Figure 20:
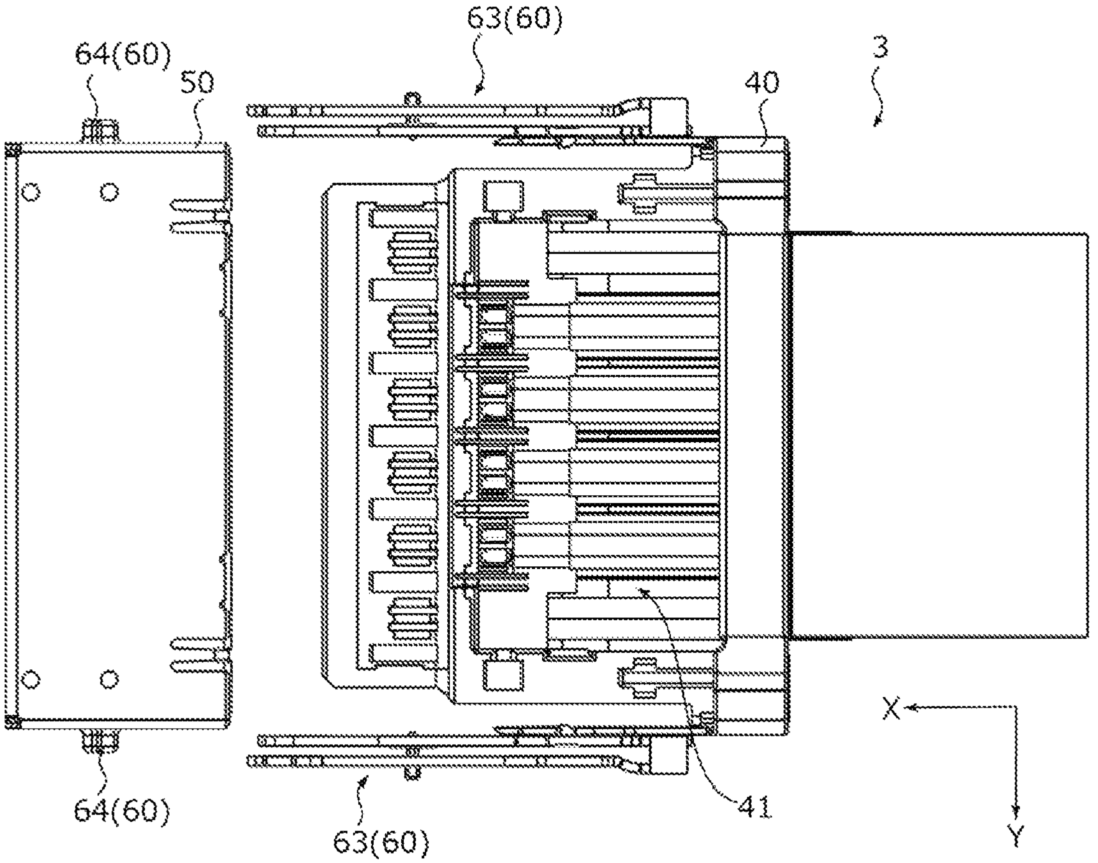
FIG. 20 is a plan view illustrating an external appearance of a connector set according to Embodiment 3.
Figure 21:
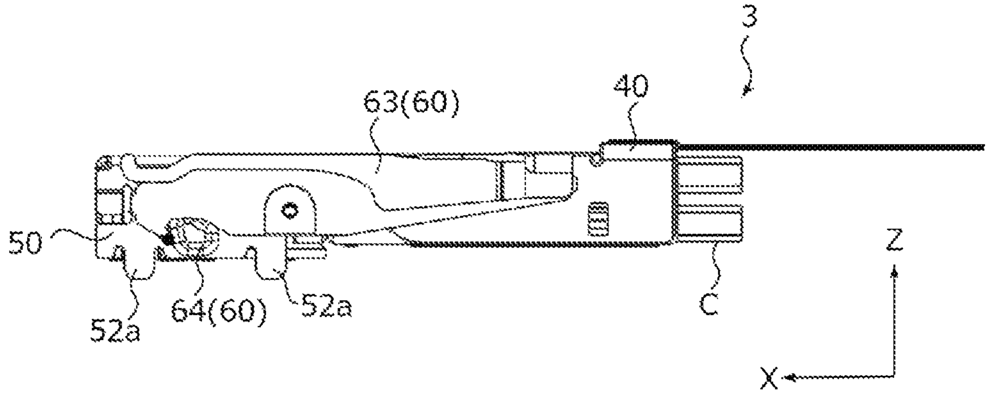
FIG. 21 is a side view illustrating the external appearance of the connector set according to Embodiment 3.

FIGS. 20 and 21 are a plan view and a side view, respectively, which illustrate an external appearance of connector set 3 according to Embodiment 3 to which the present invention is applied. In FIGS. 20 and 21, the cover shell is omitted such that lock mechanism 60 inside connector set 3 appears in the drawings.

Connector set 3 according to Embodiment 3 is mainly characterized by the structure of lock mechanism 60 and the main configurations of cable-side connector 40 and board-side connector 50 are almost the same as those of cable-side connector 40 and board-side connector 50 in Embodiment 2, and thus, a description thereof will be omitted or simplified. Further, the same or corresponding elements in lock mechanism 60 in Embodiment 3 as those in lock mechanism 60 in Embodiment 2 will be described with the same names, and a description thereof will be omitted or simplified.

As illustrated in FIGS. 20 and 21, connector set 3 includes cable-side connector 40, board-side connector 50, and lock mechanism 60. Connector set 3 electrically connects cable C and a circuit-board (not illustrated) by horizontal fitting between cable-side connector 40 and board-side connector 50.

Lock mechanism 60 is configured such that first lock mechanism 63 and second lock mechanism 64 (which may also be referred to as "engagement-receiving part 64") mechanically engage with each other in conjunction with a work of inserting cable-side connector 40 into board-side connector 50 to cause cable-side connector 40 and board-side connector 50 to be fitted together. Further, lock mechanism 60 is configured such that engagement between first lock mechanism 63 and second lock mechanism 64 is released in conjunction with a work of removing cable-side connector 40 from board-side connector 50 to release a fitted state therebetween.

Figure 22A:
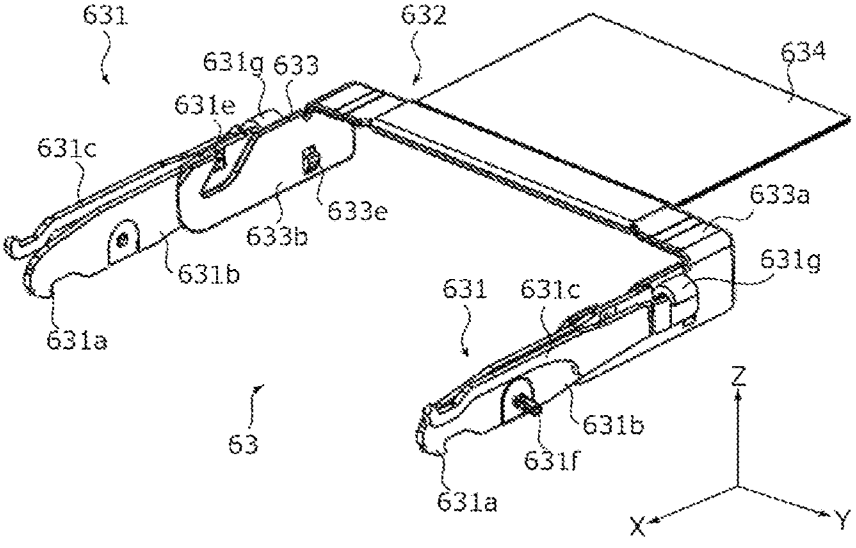
FIGS. 22A and 22B are perspective views of a first lock mechanism according to Embodiment 3.
Figure 22B:
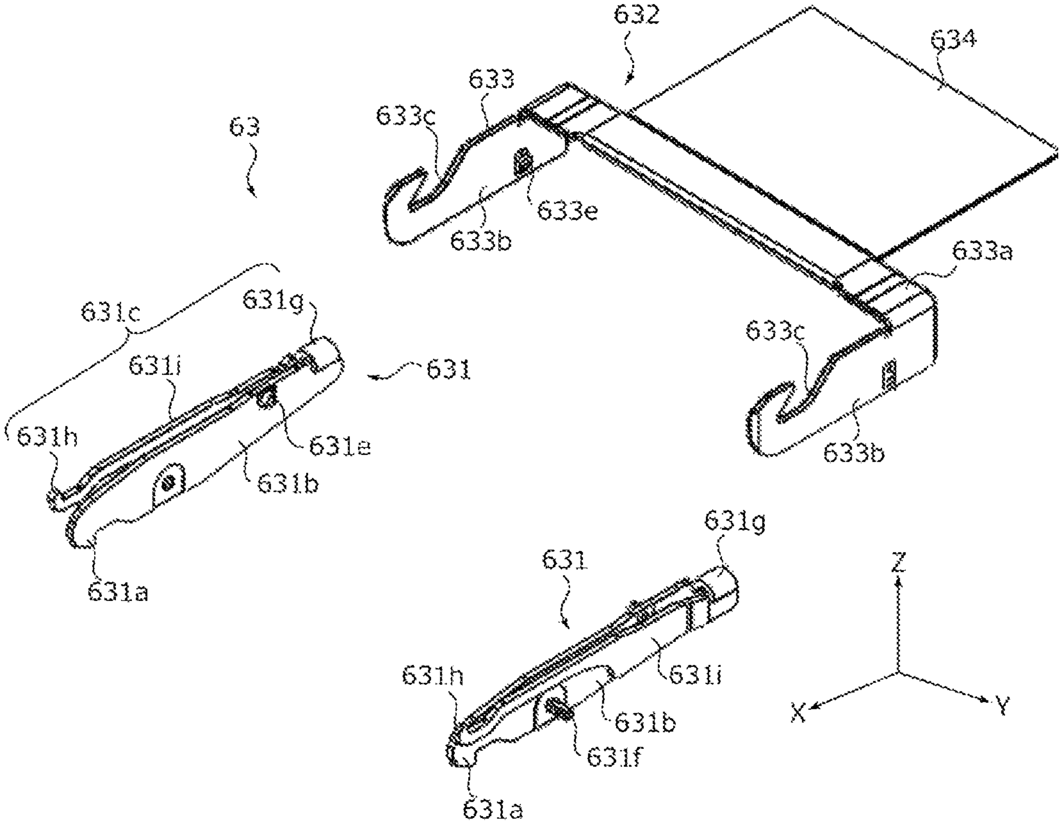

FIGS. 22A and 22B are perspective views of first lock mechanism 63 according to Embodiment 3. FIG. 22A illustrates a state in which first lock mechanism 63 is assembled, and FIG. 22B illustrates a state in which first lock mechanism 63 is disassembled.

As illustrated in FIGS. 22A and 22B, first lock mechanism 63 includes lock member 631 and removal operation member 632. Removal operation member 632 includes, for example, coupling member 633 that is connected to lock member 631, and pull tab 634 that is connected to coupling member 633.

In the present embodiment, an operation part (a portion that is grasped and operated by a worker) of removal operation member 632 is disposed on a side of the upper surface (first surface) of cable-side connector 40 in the Z-axis direction orthogonal to the removal direction and the extending direction of the pivotal shaft. Specifically, flat part 633*a* of coupling member 633 and pull tab 634 are disposed on a distal side far from a mounting surface of circuit board B in which connector set 3 is mounted.

In this case, cable C connected to cable-side connector 40 is located close to the mounting surface of circuit board B, and flat part 633*a* and pull tab 634 are located far from the mounting surface of circuit board B. In a case where connector set 3 is mounted on the upper surface of circuit board B, pull tab 634 is located above cable C connected to cable-side connector 40. Since an operation space for pull tab 634 is open, it is possible to easily perform a removal operation of pull tab 634 without being inhibited by cable C.

Each of two lock members 631 in first lock mechanism 63 is connected to coupling member 633 and is held between cover shell 42 of cable-side connector 40 and coupling member 633. That is, two lock members 631 are coupled by removal operation member 632 and are configured such that two lock members 631 move together in conjunction with an operation of pulling removal operation member 632 in the removal direction.

Lock member 631 includes engagement part 631*a*, lock plate part 631*b*, and biasing part 631*c*. Lock plate part 631*b* extends along the X-axis direction, and engagement part 631*a* is disposed at the leading-edge of lock plate part 631*b*. In lock plate part 631*b*, removal member-attaching piece 631*e* and boss 631*f* are disposed. Removal member-attaching piece 631*e* protrudes inward in the Y-axis direction (to a side on which cable-side connector body 41 is disposed), and boss 631*f* protrudes outward in the Y-axis direction.

Biasing part 631*c* includes fixed end part 631*g*, free end part 631*h*, and arm part 631*i*. Fixed end part 631*g* is a portion that is connected to lock plate part 631*b*. Free end part 631*h* is a leading-end portion on the positive side in the X-axis direction, and abuts on a component member of cable-side connector 40 (for example, spring-receiving part 41*d* of cable-side connector body 41). Arm part 631*i* couples fixed end part 631*g* and free end part 631*h*.

Biasing part 631*c* includes a bent part formed by bending at fixed end part 631*g*. The bent part is formed to be curved along the Y-axis direction (a direction intersecting the removal direction). Arm part 631*i* is disposed on an outer side of lock plate part 631*b* via fixed end part 631*g* (bent part). Arm part 631*i* is disposed such that a sheet thickness direction of arm part 631*i* coincides with the Y-axis direction (the extending direction of the pivotal shaft). In biasing part 631*c*, a predetermined restoring force is generated by elastic deformation in association with pivoting of lock member 631. That is, biasing part 631*c* is deformed in association with pivoting of lock member 631 and causes the second moment, which is opposite to the pivoting direction of lock member 631, to be generated.

Plate-attaching slit 633*c* of coupling member 633 is connected to removal member-attaching piece 631*e* of lock member 631. Removal member-attaching piece 631*e* and plate-attaching slit 633*c* form a cam that converts a linear motion in the removal direction into a rotational motion around boss 631*f* (pivotal shaft) and transmits the rotational motion to lock member 631.

In this state, cable-side connector body 41 is disposed on an inner side of coupling member 633. Lock member 631 is disposed in each of two side surfaces of cable-side connector body 41 along the XZ plane, and guide piece 633*e* of coupling member 633 is fitted into to a guide piece-engaging hole (not illustrated) of cable-side connector body 41. That is, cable-side connector body 41 (for example, cable-side insulator 414) including the guide piece-engaging hole functions as a guide member that guides a removal operation of removal operation member 632.

Further, cover shell 42 is attached to cable-side connector body 41, and boss 631*f* of lock member 631 is pivotably fitted into a boss-receiving recessed part (not illustrated) of the cover shell. Boss 631*f* functions as a pivotal shaft when lock member 631 pivots. In this way, lock member 631 is held in a predetermined attitude so as not to fall off from cable-side connector 40. Cable-side connector body 41 including the guide piece-engaging hole and the boss-receiving recessed part (both of which are not illustrated) can be said to partially form first lock mechanism 63.

When removal operation member 632 is pulled to the negative side in the X-axis direction, a tensile force acts on a portion of removal member-attaching piece 631*e*. When lock member 631 is in the reference state, removal member-attaching piece 631*e* is located on the positive side of boss 631*f* in the Z-axis direction. That is, in the reference state of lock member 631, the position of removal member-attaching piece 631*e* in the Z-axis direction is different from the position of boss 631*f* in the Z-axis direction.

In the reference state, biasing part 631*c* is preferably biased in the counterclockwise direction (so-called preload), that is, the second moment is preferably caused to be generated in lock member 631. Since the attitude of lock member 631 is stabilized by the biasing force of biasing part 631*c*, it is possible to surely hold a locked state in the fitted state and it is possible to prevent lock member 631 from rattling in the non-fitted state.

In Embodiment 2, the cam mechanism is disposed on an outer side of lock plate part 611*b*, and biasing part 611*c* is disposed on an inner side of lock plate part 611*b*. Biasing part 611*c* extends in the fitting direction (the X-axis direction) of the connector, and is configured by a leaf spring formed to be curved. Further, an inclined part which is bent inwardly for alignment with engagement-receiving part 62 of board-side connector 50 is formed in the leading-end part of lock plate part 611*b* (the part in which engagement part 611*a* is formed). For this reason, when cable C is pulled, the inclined part formed in the leading-end part of lock plate part 611*b* may be extended. On the other hand, although a problem when cable C is pulled can be solved by forming the leading-end part of lock plate part 611*b* to be straight, it is required to increase the dimension of board-side connector 50 in the pitch direction.

In the present embodiment, on the other hand, the cam mechanism is disposed on an inner side of lock plate part 631*b*, and biasing part 631*c* is disposed on an outer side of lock plate part 631*b*. The shape of the leading-end part of lock plate part 631*b* is not subject to restrictions of biasing part 631*c*, and thus, lock plate part 631*b* can be formed to be straight in alignment with the position of engagement-receiving part 62 of board-side connector 50 without providing the inclined part. Accordingly, even when cable C is pulled, lock plate part 631*b* is not deformed. Further, since biasing part 631*c* is disposed in an open space, the degree of freedom of design improves and free end part 631*h* serving as a spring load point can be located more at the most leading end on the side of the fitting surface (the side of board-side connector 50) than boss 631*f* serving as a pivotal shaft, and further the spring length can be maximized by locating fixed end part 631*g* at the most rear end and it is possible to achieve improvement in the springiness.

Figure 23:
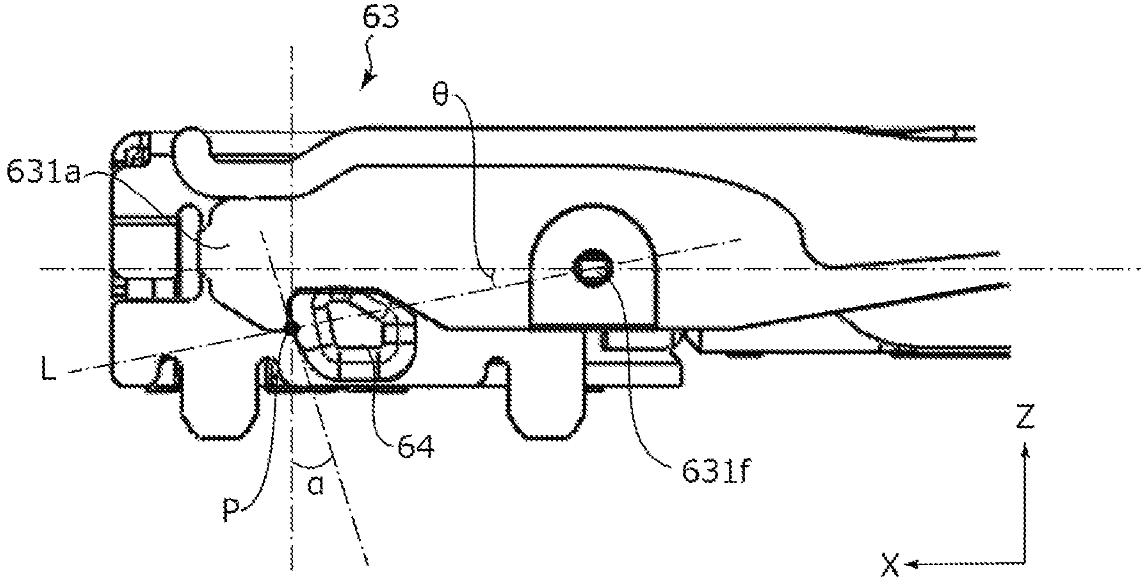
FIG. 23 illustrates an engagement state of a lock mechanism according to Embodiment 3.

FIG. 23 illustrates an engagement state of lock mechanism 60 according to Embodiment 3.

As illustrated in FIG. 23, in a state in which board-side connector 50 and cable-side connector 40 are fitted together, engagement-receiving part 64 provided in board-side connector 50 and engagement part 631*a* of lock member 631 provided in cable-side connector 40 mechanically engage with each other, and connector set 3 is held in a non-removable state to an external force of a predetermined value or lower.

Boss 631*f* is located more on the positive side in the Z-axis direction than engagement point P (the contact point at which engagement-receiving part 64 comes into contact with engagement part 631*a*). Straight line L connecting boss 631*f* and engagement point P intersects the removal direction. Straight line L coincides with the direction in which the removal direction is rotated 0 to 45° counterclockwise. In this case, the rotation locus of engagement point P and engagement-receiving part 64 do not interfere, and thus, engagement part 631*a* is pivotable.

Here, in a case where an angle formed by straight line L and the removal direction (the X-axis direction) is $\theta$ and an angle formed by the engagement surface of engagement part 631*a* and the Z-axis direction (a direction orthogonal to the removal direction and the pitch direction) at engagement point P is $\alpha$, the relationship between $\alpha$ and $\theta$ is preferably designed to satisfy "$\alpha \geq \theta$". In an actual product, it is preferable to increase $\alpha$ by a certain amount with respect to $\theta$. In a case where $\theta$ is larger than $\alpha$, the first moment is generated in lock member 631 from the beginning of a removal operation, a force is applied in a direction in which the lock is released, and the locked state is easily released. In a case where $\theta$ is equal to or less than $\alpha$, on the other hand, the second moment is generated in lock member 631 until a predetermined force or more is applied in the removal direction. Accordingly, it is possible to prevent the lock between of engagement part 631*a* and engagement-receiving part 64 from being released due to an erroneous operation, and reliability improves. Such a design is also effective in first lock mechanism 61 in Embodiment 2. Note that, $\theta$ may be intentionally configured to be larger than $\alpha$ in order to prevent occurrence of partial damage in a case where a certain external force is applied.

[Variation 1 of Embodiment 3]

Figure 24:
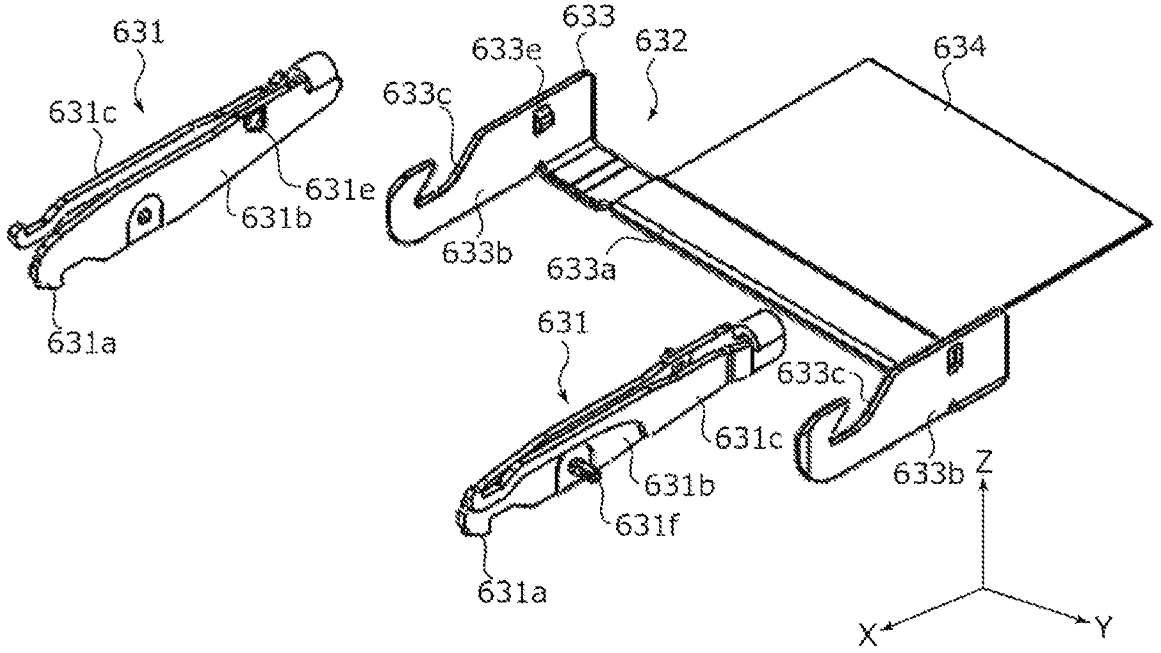
FIG. 24 illustrates a variation of the first lock mechanism according to Embodiment 3.

FIG. 24 illustrates a variation of first lock mechanism 63 according to Embodiment 3.

As illustrated in FIG. 24, in the present embodiment, the operation part (a portion that is grasped and operated by a worker) of removal operation member 632 may be disposed on a side of the back surface (second surface) of cable-side connector 40 in the Z-axis direction orthogonal to the removal direction and the extending direction of the pivotal shaft. Specifically, flat part 633*a* of coupling member 633 and pull tab 634 may be disposed on a proximal side close to the mounting surface of circuit board B in which connector set 3 is mounted. In this case, cable C connected to cable-side connector 40 is located far from the mounting surface of circuit board B, and flat part 633*a* and pull tab 634 are located close to the mounting surface of circuit board B.

In Embodiment 3, flat part 633*a* of coupling member 633 and pull tab 634 are disposed on the distal side far from the mounting surface of circuit board B in which connector set 3 is mounted (see FIG. 22B). For this reason, in a case where connector set 3 is mounted on the back surface of circuit board B, pull tab 634 is located below cable C and it is difficult to perform a removal operation of pull tab 634 by being inhibited by cable C.

Figure 25:
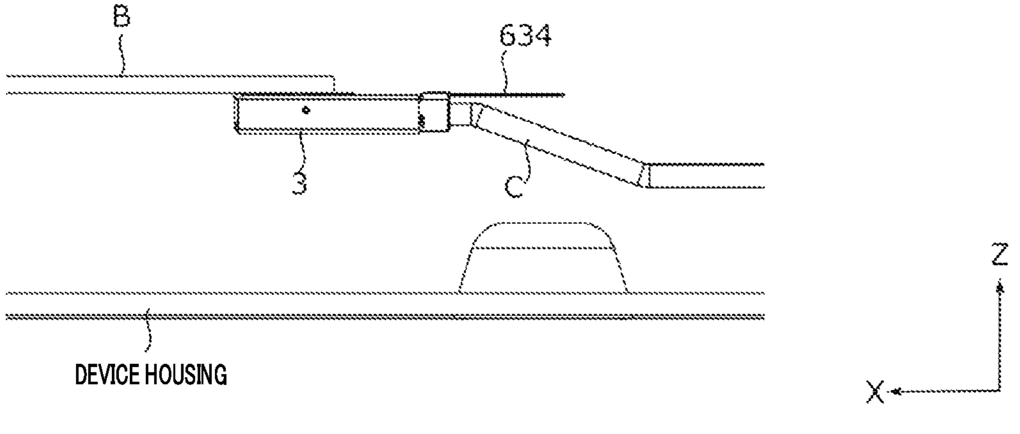
FIG. 25 illustrates an example of a use aspect of the connector set including the first lock mechanism in FIG. 24.

In the variation illustrated in FIG. 24, on the other hand, in a case where connector set 3 is mounted on the back surface of circuit board B, pull tab 634 is located above cable C connected to cable-side connector 40 (see FIG. 25). Since the operation space for pull tab 634 is open, it is possible to easily perform a removal operation of pull tab 634 without being inhibited by cable C.

Removal operation member 612 in Embodiment 3 (hereinafter referred to as "first removal operation member 612") and removal operation member 632 indicated in the variation (hereinafter referred to as "second removal operation member 632") only differ in the disposition of coupling member 633 and pull tab 634 and the other structures thereof are common. Accordingly, it is possible to selectively apply one of first removal operation member 612 and second removal operation member 632 to lock member 611 or 613 where lock members 611 and 613 are common.

Cable-side connector body 41 (for example, cable-side insulator 414) that functions as a guide member preferably includes both a first guide part (for example, a guide piece-engaging hole that engages with guide piece 633*e*) for first removal operation member 612 and a second guide part for second removal operation member 632. Thus, it is possible to easily realize connector set 3 suitable for a mounting surface only by selecting first removal operation member 612 and second removal operation member 632 appropriately. Further, components of connector set 3 for upper surface mounting to which first removal operation member 612 is applied and components of connector set 3 for back surface mounting to which second removal operation member 632 is applied can be common, and thus, it is possible achieve cost reduction.

[Variation 2 of Embodiment 3]

Figure 26A:
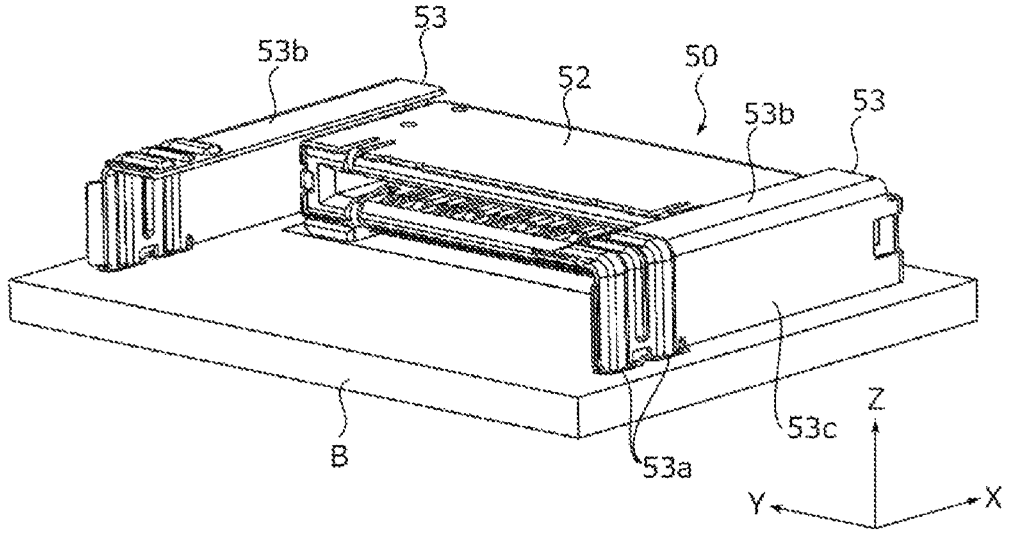
FIGS. 26A and 26B illustrate a variation of a board-side connector according to Embodiment 3.
Figure 26B:
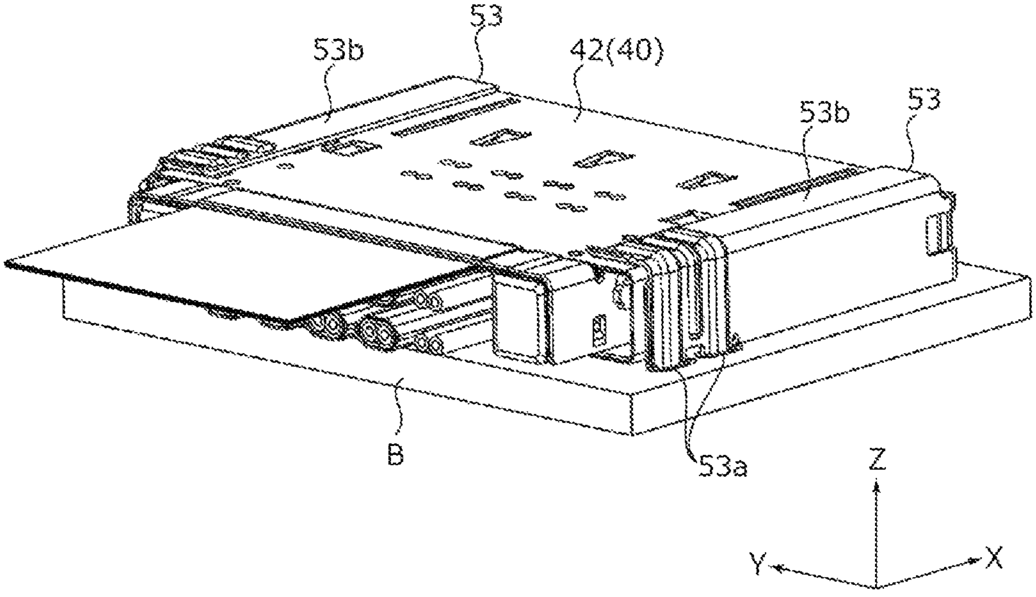

FIGS. 26A and 26B illustrate a variation of board-side connector 50 according to Embodiment 3. FIG. 26B illustrates a state in which cable-side connector 40 is fitted into board-side connector 50.

Board-side connector 50 according to Embodiment 3 includes board-side shell 52 that is connected to the ground pattern of circuit board B. Board-side shell 52 is provided with board-mounting part 52*a* that is inserted into a through-hole of circuit board B (see FIG. 21).

In Variation 2, reinforcement shell 53 (second shell) is provided in addition to board-side shell 52 (first shell). Reinforcement shell 53 is disposed on both sides of board-side connector body 51 in the Y-axis direction. Two reinforcement shells 53 are formed integrally with board-side shell 52 by, for example, sheet metal working (including punching and bending) of one metal sheet.

Reinforcement shell 53 includes board-mounting part 53*a*, top surface part 53*b*, and side surface part 53*c*. Side surface part 53*c* is a portion that is disposed on both sides of board-side connector body 51 in the Y-axis direction.

Board-mounting part 53*a* is disposed in a lower end part of side surface part 53*c* on the negative side in the X-axis direction (the side of the fitting surface). Reinforcement shell 53 is electrically connected to the ground pattern of circuit board B by inserting board-mounting part 53*a* into the through-hole of circuit board B and soldering thereof.

Top surface part 53*b* is formed to protrude from an upper end of side surface part 53*c*. Top surface part 53*b* has, for example, an eaves shape whose one end is open. In a state in which cable-side connector 40 is fitted into board-side connector 50, top surface part 53*b* presses cover shell 42 of cable-side connector 40 from above and is physically and electrically connected to cover shell 42.

When a removal operation to remove cable-side connector 40 is performed obliquely upward with respect to the removal direction (horizontal direction), a force is applied to the connection portion (removal force acting side) of coupling member 633 and pull tab 634 and a moment is generated in board-side connector 50.

In a case where reinforcement shell 53 is disposed, the moment that acts on the soldered portion between board-side connector 50 and circuit board B is dispersed in board-mounting parts 52*a* and 53*a* and therefore becomes smaller than that in a case where there is no reinforcement shell 53. In particular, board-mounting part 53*a* is disposed on the side of the fitting surface of board-side connector 50 and has a short distance from the removal force acting side, and thus, the moment generated during a removal operation is small. Further, the upper surface of cable-side connector 40 is pressed by top surface part 53*b*, and a removal operation obliquely upward is limited. Thus, it is possible to prevent the soldered portion from being damaged by a removal operation of cable-side connector 40 and the electrical connection with circuit board B from being impaired, and reliability improves.

Here, two reinforcement shells 53 may be configured separately from board-side shell 52. In this case, the need for reinforcement shell 53 is determined according to the use form (for example, the required strength) of connector set 3 and reinforcement shell 53 can be added as appropriate. Accordingly, convenience improves and it is possible to reduce the cost of connector set 3 having the basic configuration without reinforcement shell 53.

Further, in a case where two reinforcement shells 53 are configured separately from board-side shell 52, two reinforcement shells 53 may be coupled and integrated. For example, top surface parts 53*b* of two reinforcement shells 53 are coupled to form one top surface part to cover the upper surfaces of cable-side connector 40 and board-side connector 50 entirely.

Note that, reinforcement shell 53 is also effective for board-side connectors 20 and of Embodiments 1 and 2.

Embodiment 4

Figure 27:
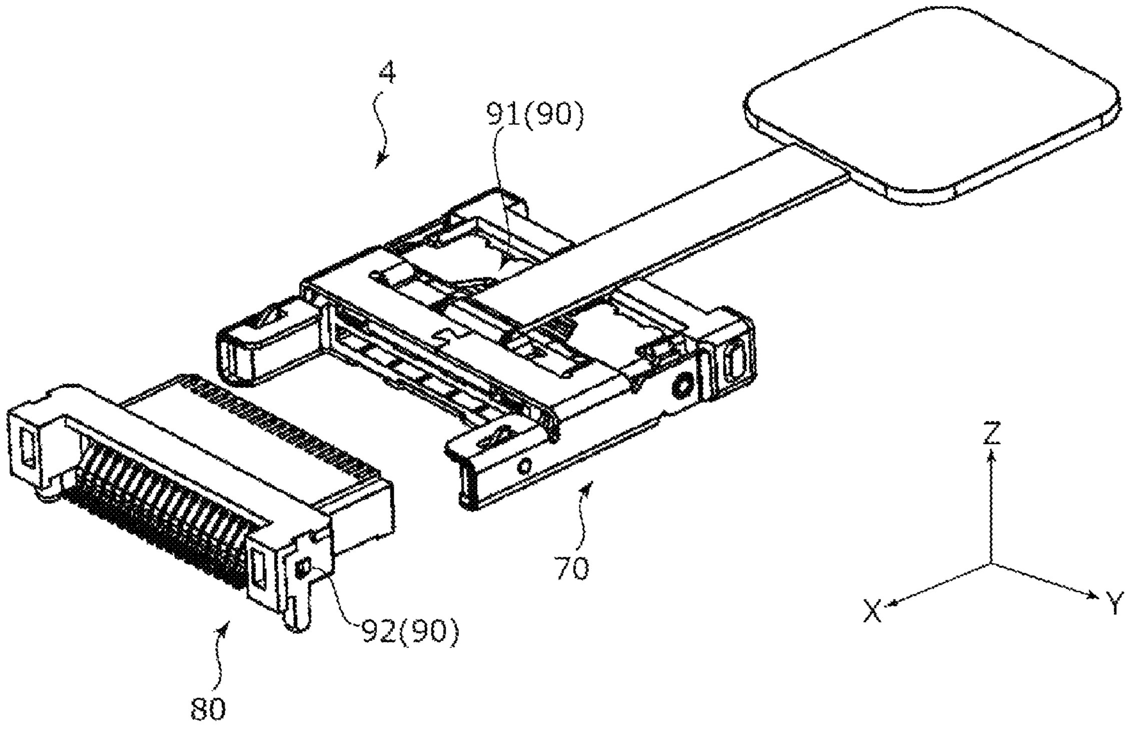
FIG. 27 is a perspective view illustrating an external appearance of a connector set according to Embodiment 4.
Figure 28:
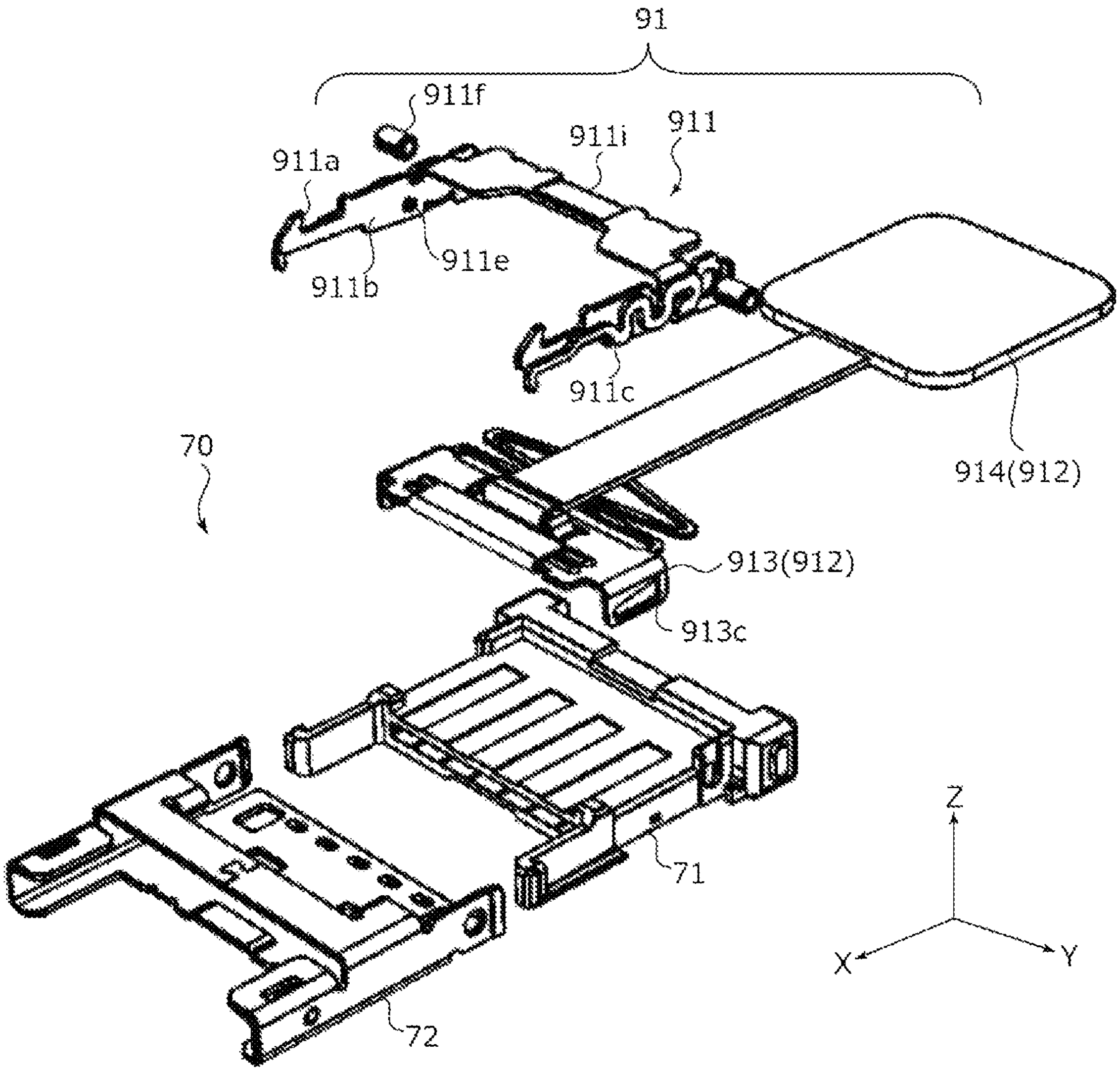
FIG. 28 is an exploded perspective view of a cable-side connector according to Embodiment 4.

FIG. 27 is a perspective view illustrating an external appearance of connector set 4 according to Embodiment 4. FIG. 28 is an exploded perspective view of cable-side connector 70 according to Embodiment 4.

As illustrated in FIG. 27, connector set 4 includes cable-side connector 70, board-side connector 80, and lock mechanism 90. Connector set 4 electrically connects a cable and a circuit board (not illustrated) by horizontal fitting between cable-side connector 70 and board-side connector 80.

In connector set 4, the main configurations of cable-side connector 70 and board-side connector 80 are almost the same as those of cable-side connector 40 and board-side connector 50 in Embodiment 2, and thus, a description thereof will be omitted or simplified. Further, even the same or corresponding elements in lock mechanism 90 as those in lock mechanism 60 in Embodiment 2 will be described with the same names, and a description thereof will be omitted or simplified.

Lock mechanism 90 is configured such that first lock mechanism 91 and second lock mechanism 92 (which may also be referred to as "engagement-receiving part 92") mechanically engage with each other in conjunction with a work of inserting cable-side connector 70 into board-side connector 80 to cause cable-side connector 70 and board-side connector 80 to be fitted together. Further, lock mechanism 90 is configured such that engagement between first lock mechanism 91 and second lock mechanism 92 is released in conjunction with a work of removing cable-side connector 70 from board-side connector 80 to release a fitted state therebetween.

As illustrated in FIG. 28, first lock mechanism 91 includes lock member 911 and removal operation member 912. Removal operation member 912 includes, for example, coupling member 913, which is connected to lock member 911, and pull tab 914, which is connected to coupling member 913.

Lock member 911 includes engagement part 911*a*, lock plate part 911*b*, biasing part 911*c*, and bridging part 911*i*. In the present embodiment, two lock plate parts 911*b* are disposed to face each other in the Y-axis direction and are coupled by bridging part 911*i* having an arch shape.

Lock plate part 911*b* extends along the X-axis direction, and engagement part 911*a* is disposed at the leading-edge of lock plate part 911*b*. In lock plate part 911*b*, removal member-attaching piece 911*e* and boss 911*f* are disposed. Removal member-attaching piece 911*e* protrudes inward in the Y-axis direction (to a side on which cable-side connector body 71 is disposed), and boss 911*f* protrudes outward in the Y-axis direction. Note that, boss 911*f* may be provided integrally with an insulator (not illustrated) of cable-side connector body 71 and protrude outward through a through-hole provided in lock plate part 911*b*.

In the present embodiment, the lock mechanism is disposed on an inner side of lock plate part 911*b* of lock member 911, and biasing part 911*c* is disposed on an outer side of lock plate part 911*b*.

Figure 29:
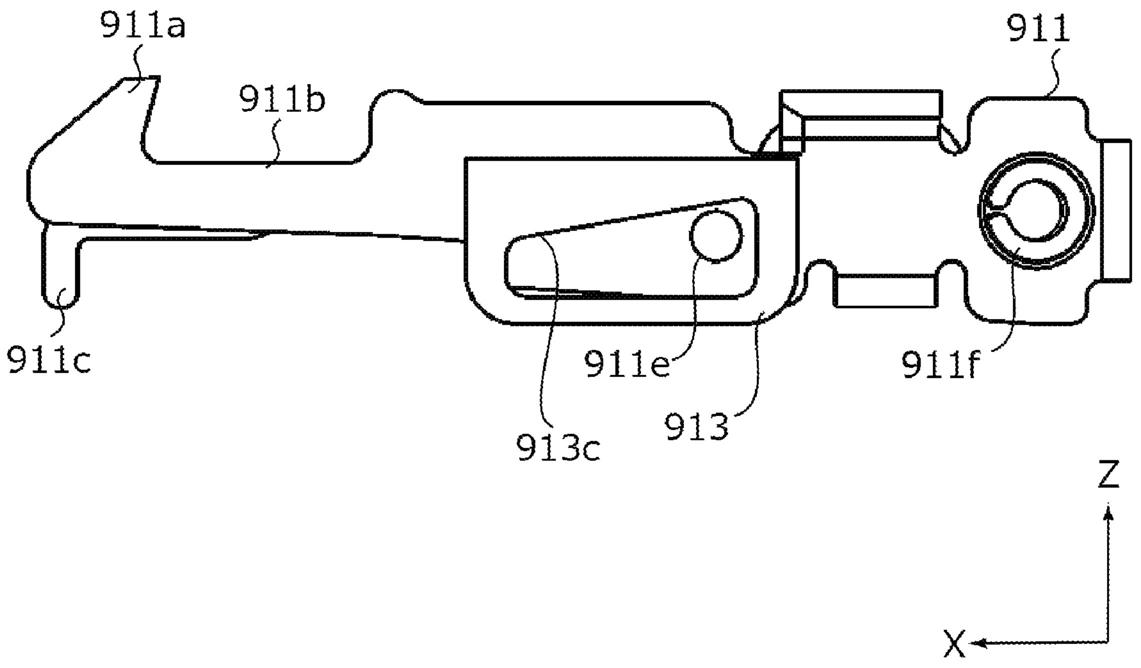
FIG. 29 illustrates a positional relationship among a cam mechanism, a pivotal shaft, and an engagement part in Embodiment 4.

Plate-attaching slit 913*c* of coupling member 913 is connected to removal member-attaching piece 911*e* of lock member 911. Removal member-attaching piece 911*e* and plate-attaching slit 913*c* form a cam mechanism that converts a linear motion in the removal direction into a rotational motion around boss 911*f* (pivotal shaft) and transmits the rotational motion to lock member 911. The cam mechanism is located in the middle of boss 911*f* (pivotal shaft) and engagement part 911*a* (see FIG. 29).

In Embodiment 4, two lock-plate parts 911*b* are coupled by bridging part 911*i* and are formed of one member. Thus, the assembly work of lock mechanism 90 is facilitated. Having said that, since bridging part 911*i* also pivots together with lock plate part 911*b*, it is necessary to devise that no other component elements interfere therewith.

As a variation of Embodiment 4, two lock plate parts 911*b* may be formed of separate members (see Embodiments 2 and 3). In this case, it is not necessary to consider interference with other component elements, and thus, the degree of freedom of design may improve, but the assembly work of lock mechanism 90 may be cumbersome.

Note that, in Embodiments 2 and 3, two lock plate parts 611*b* may be coupled and be formed of one member.

Although the structure in Embodiments 2 to 4 is that the removal operation member includes the inclined surface formed to be inclined with respect to the removal direction and the lock member includes the engagement piece that engages with the inclined surface, but the cam mechanism may be formed with the structure that the removal operation member includes the inclined surface formed to be inclined with respect to the removal direction and the lock member includes the engagement piece that engages with the inclined surface.

In the above embodiments, the connector set that physically and electrically connects the first connector (for example, cable-side connector 10) and the second connector (for example, board-side connector 20) has been described, but the lock mechanism of the present invention is applicable to a connector set that physically connects between two objects. That is, connectors to which the lock mechanism of the present invention is applicable may not have electrical elements such as contacts as described in the embodiments.

The embodiments disclosed herein are merely exemplifications in every respect and should not be considered as limitative. The scope of the present invention is specified not by the description provided above, but by the appended claims, and is intended to include all modifications in so far as they are within the scope of the appended claims or the equivalents thereof.

The invention claimed is:

1. A lock mechanism configured to hold a fitted state between a first connector and a second connector, the first connector and the second connector as a counterpart being fittable together, the lock mechanism comprising:

a lock member that includes an engagement part and is provided in the first connector;

a biasing part that is connected to the lock member and holds the lock member in a reference state;

a pivotal shaft that is disposed parallel to a direction orthogonal to a fitting direction and pivotably supports the lock member;

an engagement-receiving part that is provided in the second connector and is engageable with the engagement part, and a removal operation member that is connected to the lock member and is pullable in a removal direction orthogonal to an extending direction of the pivotal shaft, wherein the lock member is attached to the first connector so as to be pivotable around the pivotal shaft, one of the removal operation member and the lock member includes an inclined surface formed to be inclined with respect to the removal direction, the other of the removal operation member and the lock member includes an engagement piece that engages with the inclined surface, a cam is formed by engagement between the inclined surface and the engagement piece, the cam converting a linear motion of the removal operation member into a rotational motion and transmits the rotational motion to the lock member, and a linear motion of the removal operation member in the removal direction causes a first moment to be generated, the first moment rotating the lock member around the pivotal shaft.

2. The lock mechanism according to claim 1, wherein the first connector and the second connector include contacts arranged in the direction orthogonal to the fitting direction and are electrically connected by the contacts.

3. The lock mechanism according to claim 1, wherein:

the lock member includes a removal member-attaching part to which the removal operation member is connected, and a direction connecting the removal member-attaching part and the pivotal shaft intersects the removal direction.

4. The lock mechanism according to claim 1, wherein in a case where, in side view as viewed from the extending direction of the pivotal shaft, an angle formed by a straight line connecting the pivotal shaft and an engagement point of the engagement part and the removal direction is $\theta$ and an angle formed by an engagement surface of the engagement part and a direction orthogonal to the removal direction at the engagement point is $\alpha$, a relationship between $\alpha$ and $\theta$ satisfies $\alpha \geq \theta$.

5. The lock mechanism according to claim 1, wherein:

the lock member includes a plate part having a sheet shape, and the lock member is disposed such that a sheet thickness direction of the plate part coincides with the extending direction of the pivotal shaft.

6. The lock mechanism according to claim 1, wherein:

the lock member is disposed in each of two side surfaces of the first connector, the two side surfaces facing each other in the extending direction of the pivotal shaft, and the removal operation member couples the two lock members.

7. The lock mechanism according to claim 6, wherein the removal operation member is a rigid body that is non-deformable with respect to a pulling operation in the removal direction.

8. The lock mechanism according to claim 1, further comprising a guide member that guides a removal operation of the removal operation member, wherein:

the removal operation member is one of a first removal operation member and a second removal operation member, the first removal operation member being disposed on a side of a first surface of the first connector in a direction orthogonal to the removal direction and the extending direction of the pivotal shaft, the second removal operation member being disposed on a side of a second surface opposite to the first surface, and the guide member includes a first guide part and a second guide part, the first guide part guiding the first removal operation member, the second guide part guiding the second pulling operation member.

9. The lock mechanism according to claim 8, wherein:

the removal operation member includes a pull tab graspable and pullable by a worker, the pull tab is disposed in the first removal operation member so as to be exposed from the side of the first surface, and the pull tab is disposed in the second removal operation member so as to be exposed from the side of the second surface.

10. The lock mechanism according to claim 1, wherein the biasing part is formed integrally with the lock member, is deformed in association with pivoting of the lock member, and generates a second moment that is opposite to a pivoting direction of the lock member.

11. The lock mechanism according to claim 10, wherein the biasing part includes a free end part, a fixed end part, and an arm part, the free end part abutting on a component member of the first connector, the fixed end part being connected to the lock member, the arm part coupling the free end part and the fixed end part.

12. The lock mechanism according to claim 11, wherein:

the lock member includes a plate part having a sheet shape, and the biasing part includes a bent part in the fixed end part, the bent part extending in a direction intersecting the removal direction and being formed to be curved, and the arm part is disposed on an outer side of the plate part via the bent part.

13. The lock mechanism according to claim 12, wherein the arm part is disposed such that a sheet thickness direction of the arm part coincides with the extending direction of the pivotal shaft.

14. The lock mechanism according to claim 1, wherein:

the engagement-receiving part includes an abutting surface that abuts on the engagement part when the first connector is moved in an insertion direction, and the abutting surface is formed to be inclined and allows the engagement part to be raised on the abutting surface such that the lock member pivots in association with movement of the first connector in the insertion direction.

15. A connector set, comprising:

a first connector;

a second connector, the first connector and the second connector as a counterpart being fittable together; and the lock mechanism according to claim 1.

16. The connector set according to claim 15, wherein: the second connector includes a first shell and a second shell, the first shell covering a second connector body, the second shell including a side surface part that is disposed on both sides of the second connector body in a direction orthogonal to the fitting direction, wherein the second shell includes a board-mounting part and a top surface part, the board-mounting part being disposed in a lower end part of the side surface part on a side of a fitting surface with the first connector, the top surface part being formed to protrude from an upper end of the side surface part and engaging with an upper surface of the first connector.

17. The connector set according to claim 16, wherein the first shell and the second shell are formed of separate members.

* * * * *